Jan. 7, 1936. H. KOMUSIN GEB. PETTERSSON 2,027,287
APPARATUS FOR DELIVERING AND AFFIXING LABELS, POSTAGE STAMPS AND THE LIKE
Filed May 10, 1934 9 Sheets-Sheet 3
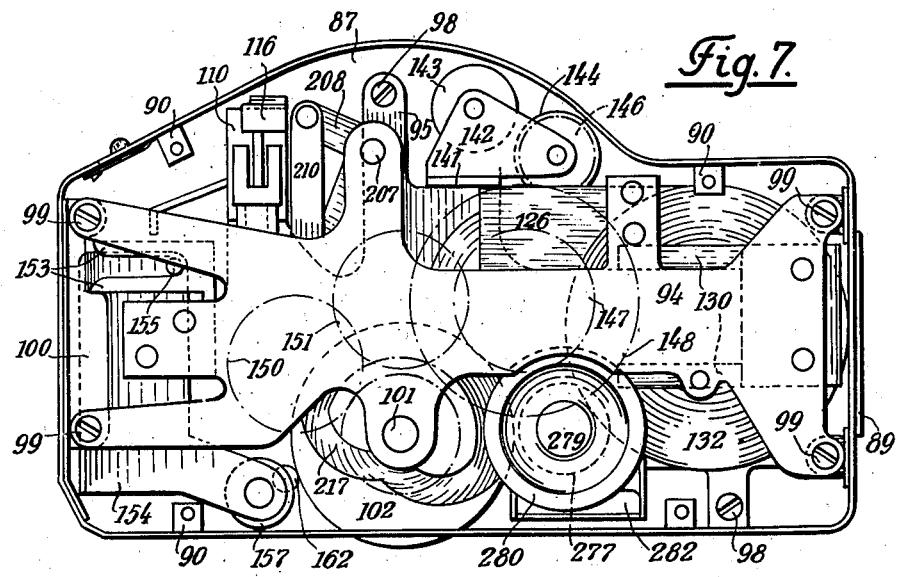
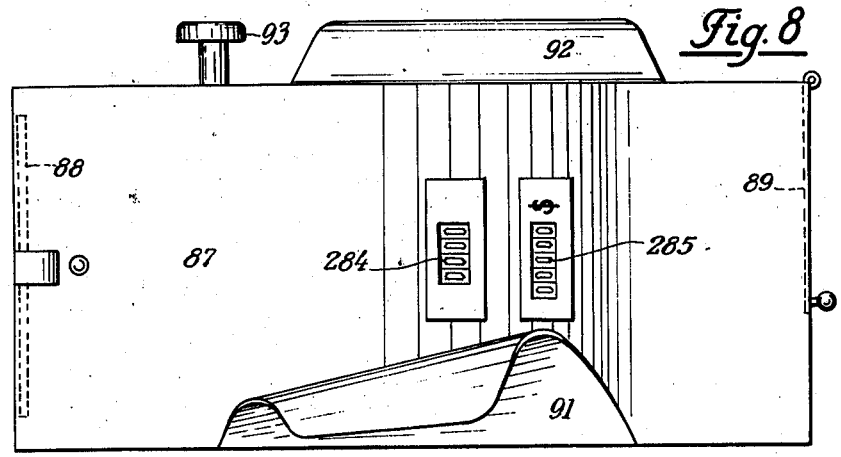
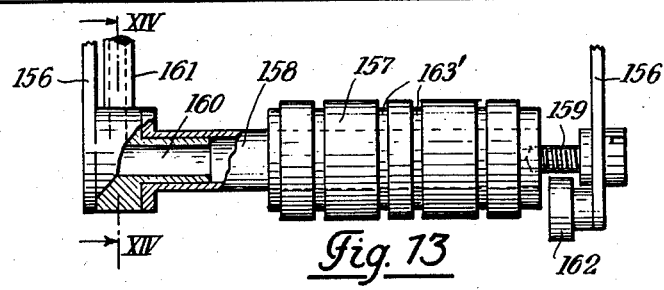

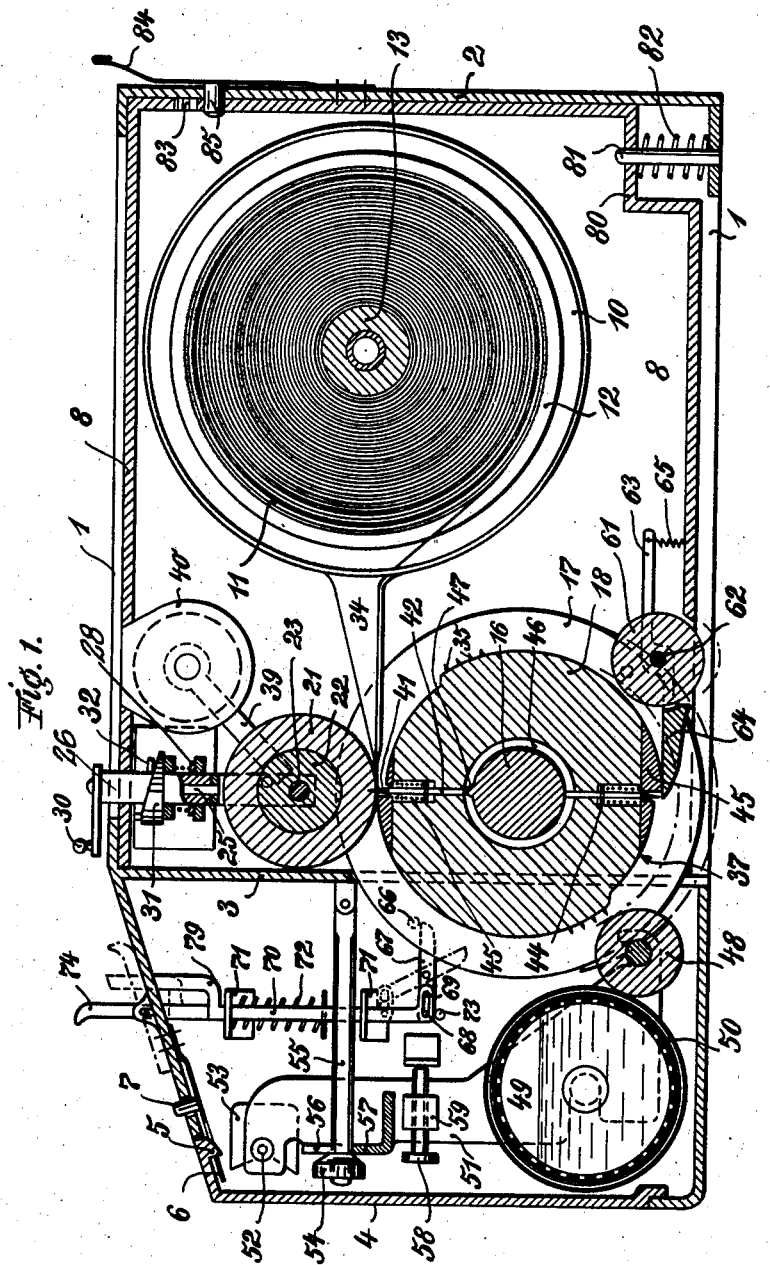

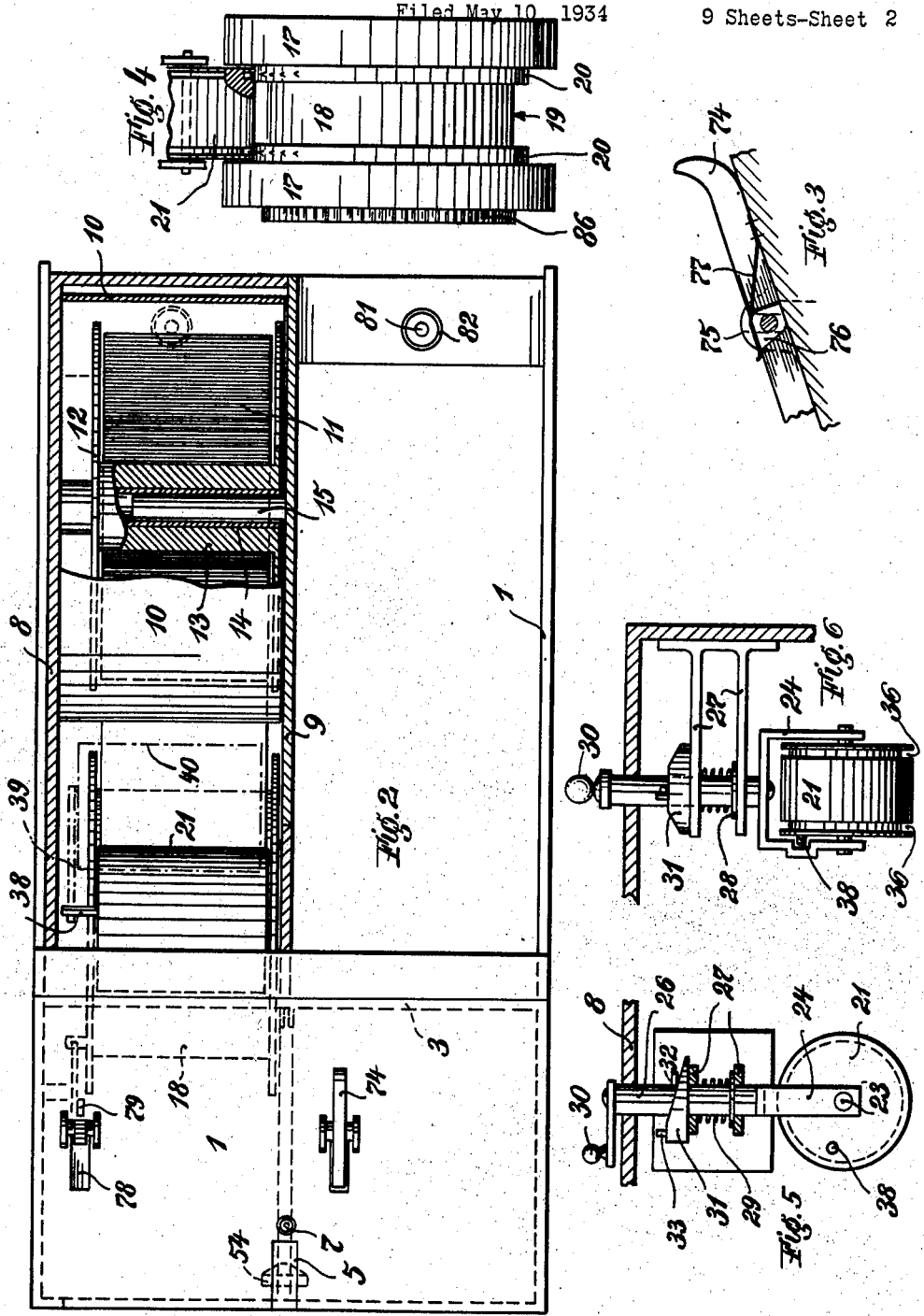

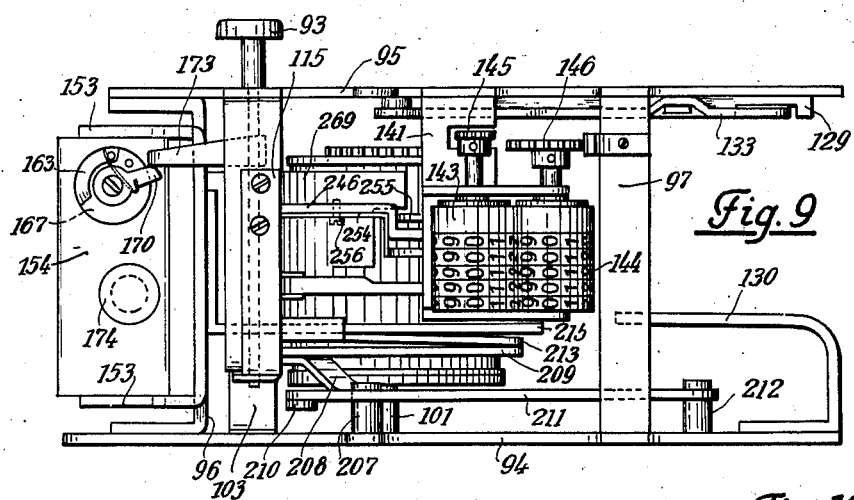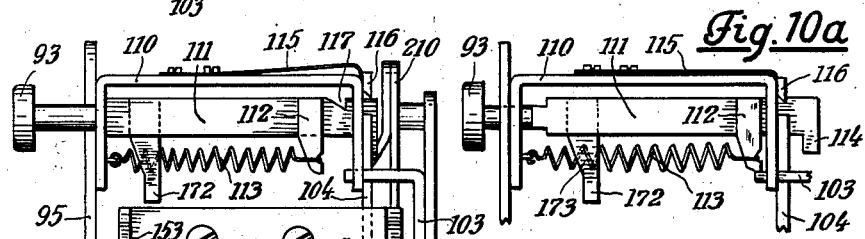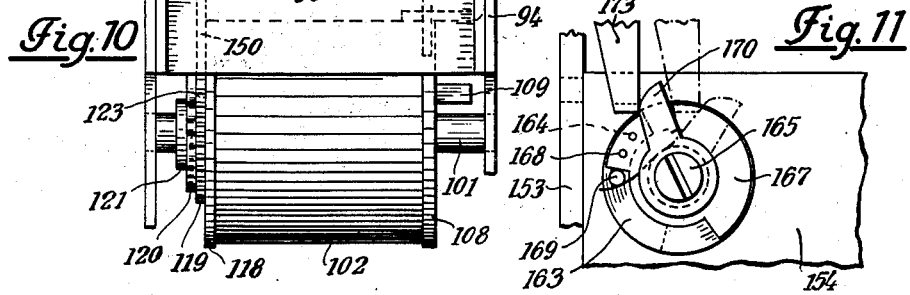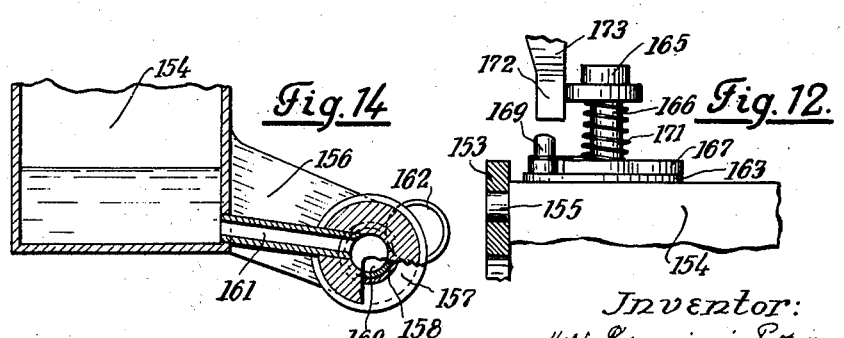

Jan. 7, 1936.   H. KOMUSIN GEB. PETTERSSON   2,027,287
APPARATUS FOR DELIVERING AND AFFIXING LABELS, POSTAGE STAMPS AND THE LIKE
Filed May 10, 1934   9 Sheets-Sheet 5
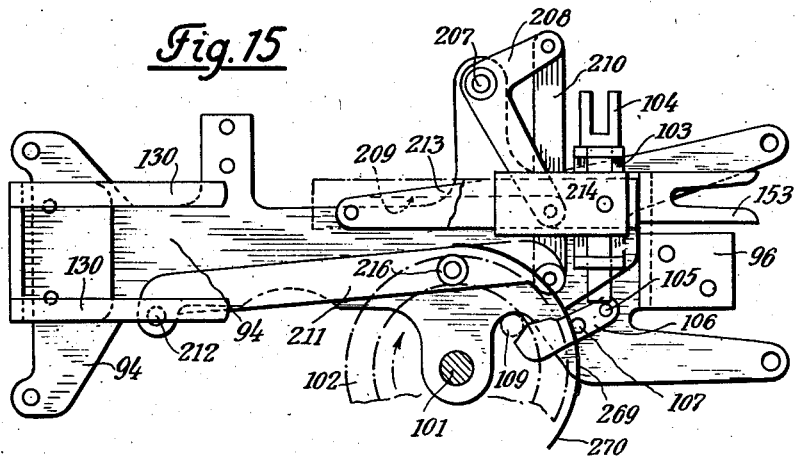
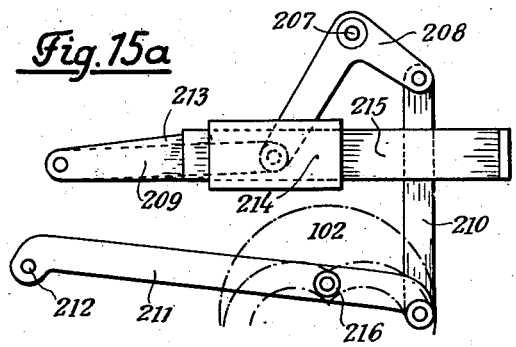
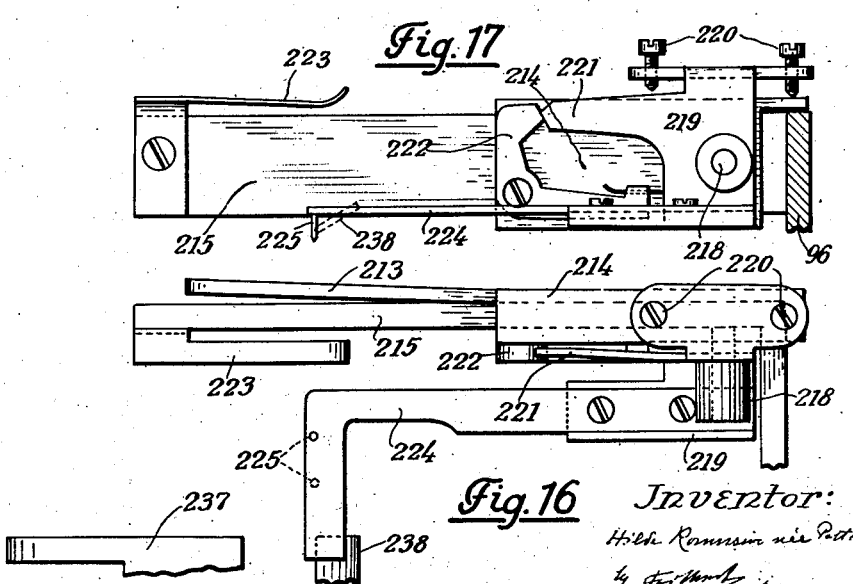

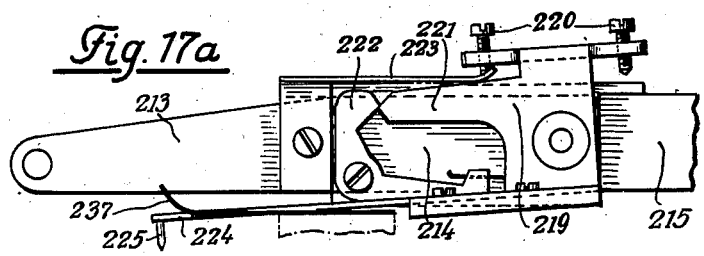
Fig. 17a
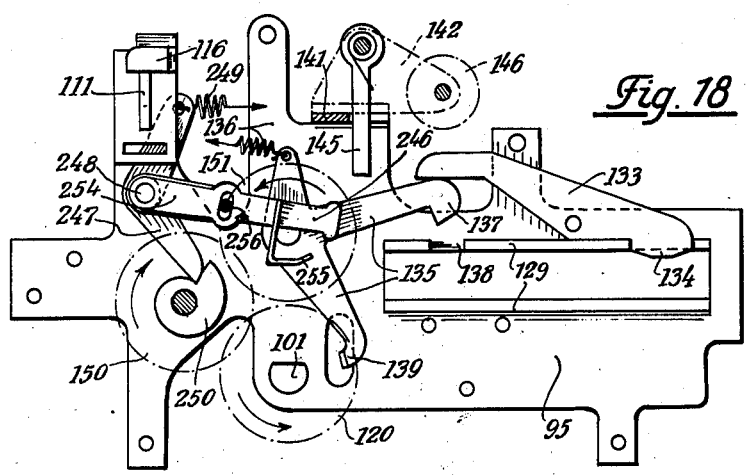
Fig. 18
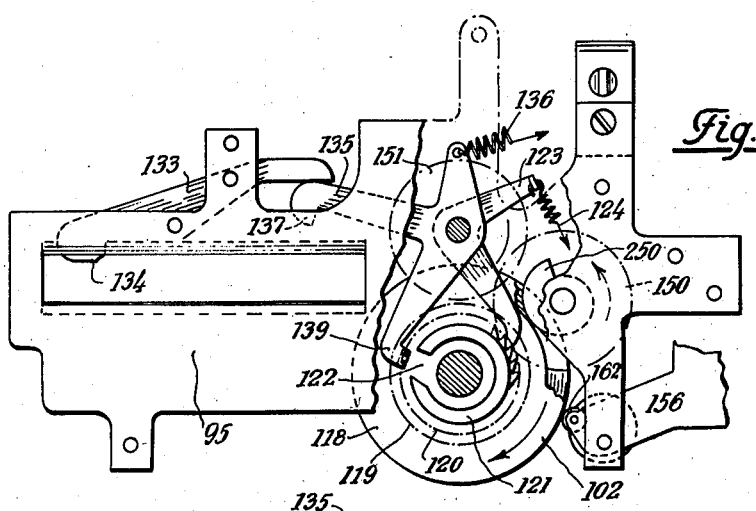
Fig. 19
Fig. 20
Inventor:

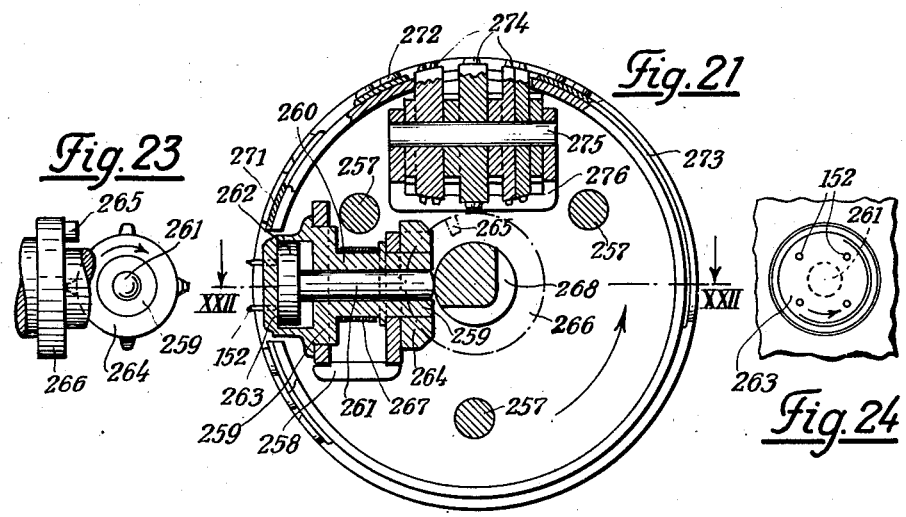
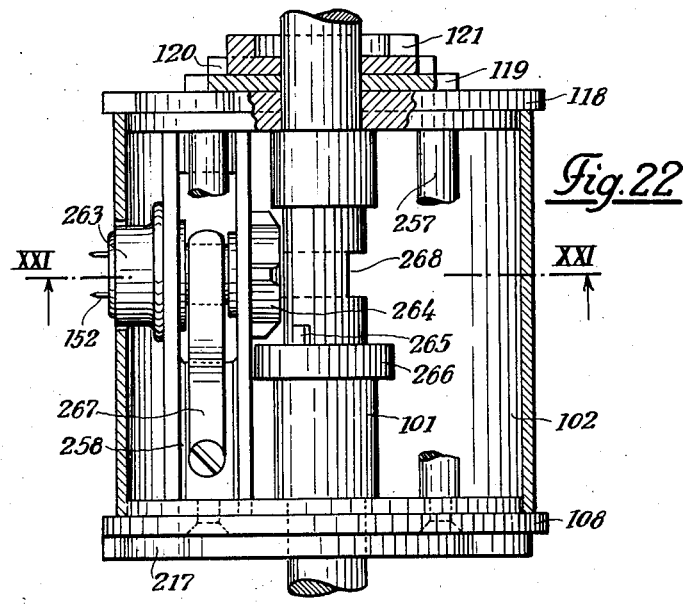
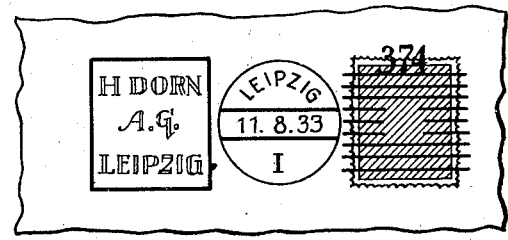

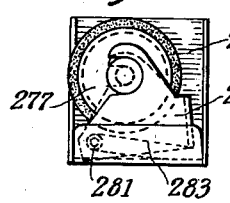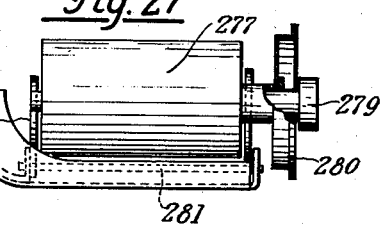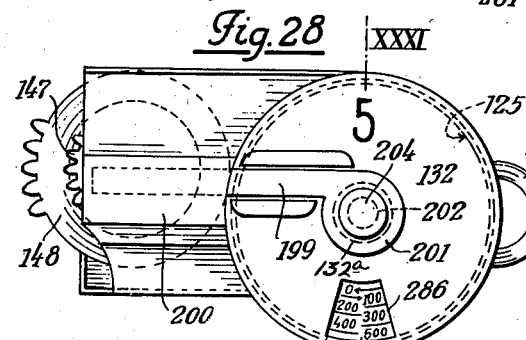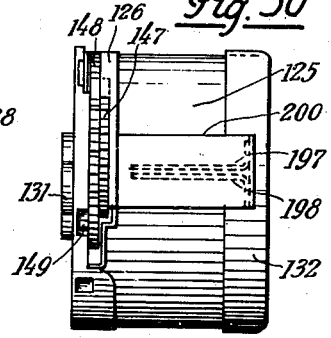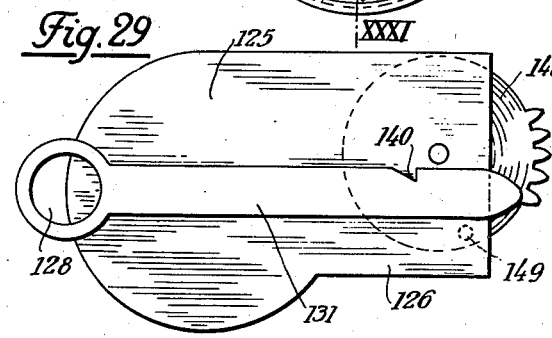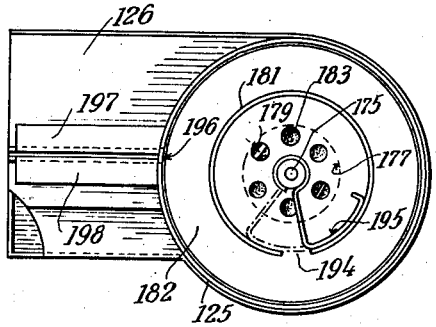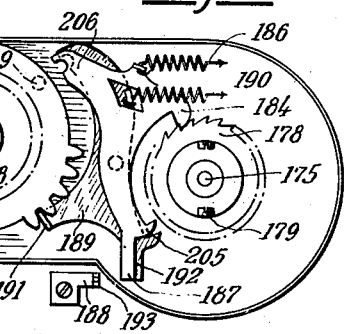

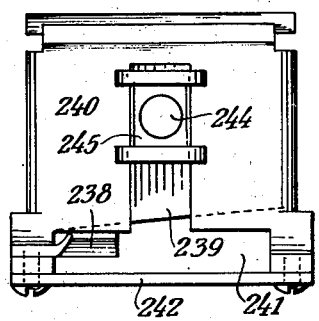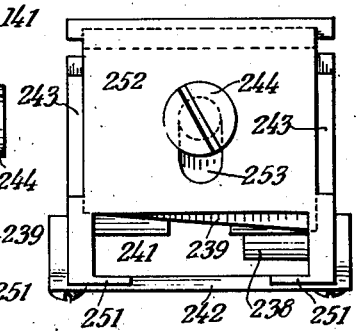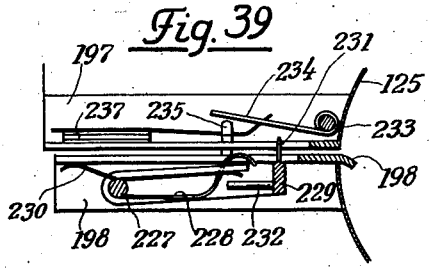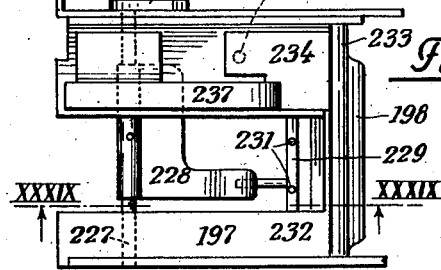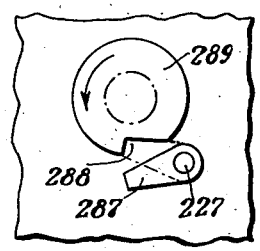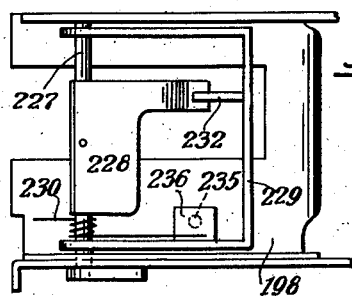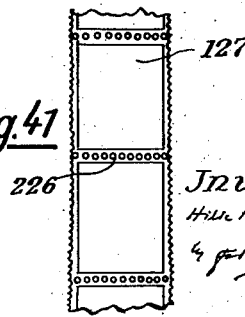

Patented Jan. 7, 1936

2,027,287

UNITED STATES PATENT OFFICE 2,027,287

APPARATUS FOR DELIVERING AND AFFIXING LABELS, POSTAGE STAMPS, AND THE LIKE

Hilde Komusin, geb. Pettersson, Berlin-Treptow, Germany

Application May 10, 1934, Serial No. 724,956
In Germany October 31, 1932

71 Claims. (Cl. 216—25)

This invention relates to a small hand operated apparatus for delivering, affixing and, if necessary, defacing labels, postage stamps and the like.

The affixing of postage stamps, "registered" numbers, excise stamps and similar gummed labels by hand is inconvenient and wastes time; and moreover, it does not allow any automatic control concerning the consumption. Apparatuses are already known for affixing postage stamps on letters, printed matter and the like and for defacing the same, but these apparatus allow no control of the delivery so that they can be used indiscriminately, that is also by unauthorized persons.

As compared herewith the invention relates to an apparatus, which, in spite of its small size, ensures an absolutely reliable delivery and affixing of the stamps or labels and, if necessary, also of stamps of different values or of several kinds of gummed labels. The considerable simplification of the apparatus according to the invention is rendered possible by the fact that a driving device, rotated during the forward movement of the apparatus, controls the arrangements for unwinding the strip from a storage reel and those for severing, moistening and affixing the portion of the strip delivered. It is particularly advantageous to rotate the driving device directly by the forward movement of the apparatus over the support on which the stamps are to be affixed. The employment of a common driving device for all the individual devices arranged in the interior of the apparatus enables the manipulations which must be carried out by the operator to be limited to a single operation, contrary to the known arrangements, in which the end of the label to be affixed must be first brought on to the letter or other support by separate manipulations.

The common driving device can further control other devices, especially when employing the apparatus for affixing postage stamps, which devices effect the addition of the values of all the stamps delivered, and other devices which mark either the stamp or the letter on which it is affixed or both for the purpose of defacement.

Several embodiments of the invention are illustrated by way of example in the accompanying drawings in which:—

Fig. 1 is a longitudinal section through an apparatus designed to deliver, for example two kinds of gummed labels.

Fig. 2 is a top plan view of Fig. 1, partly in section.

Fig. 3 shows in its operative position a lever for starting the machine.

Fig. 4 shows the driving device in elevation.

Fig. 5 is a side view of the pressure roller.

Fig. 6 is a front elevation of Fig. 5.

Fig. 7 shows a modified form of construction of the machine in left side elevation after the removal of the side wall.

Fig. 8 is a top plan view of the machine.

Fig. 9 is a top plan view of the gearing after removal of the stamp cap.

Fig. 10 shows the side wall of the gearing with the moistening device removed.

Fig. 10a shows in a different position some of the parts illustrated in Fig. 10.

Fig. 11 is a top plan view showing some of the parts of the moistening device on a larger scale.

Fig. 12 is a side elevation of Fig. 11.

Fig. 13 is a top plan view of the moistening roller.

Fig. 14 is a section on line XIV—XIV of Fig. 13 showing also the water tank.

Fig. 15 is an internal view of the left side part of the gearing supporting frame with the gearing elements carried thereby.

Fig. 15a shows some of these gearing elements in a different operative position.

Fig. 16 shows in top plan view some of these gearing elements on a larger scale.

Figs. 17 and 17a show in side elevation these gearing elements in two different positions.

Fig. 18 is an internal view of the right side part of the gearing carrier frame with the gearing elements carried thereby.

Fig. 19 is an external view of Fig. 18.

Fig. 20 is a top plan view of Fig. 18.

Fig. 21 is an enlarged cross section through the pressure drum taken on line XXI—XXI of Fig. 22.

Fig. 22 is a longitudinal section through the pressure drum taken on line XXII—XXII of Fig. 21.

Fig. 23 shows the drive for a wall device for the stamps.

Fig. 24 is a top plan view of Fig. 23.

Fig. 25 shows a printed impression.

Fig. 26 is a side elevation of the inking device.

Fig. 27 is a front elevation of Fig. 26.

Fig. 28 is a left side elevation of a stamp cap.

Fig. 29 is a right side elevation of Fig. 28.

Fig. 30 is an end view of Fig. 28.

Fig. 31 is a cross section through the stamp cap taken on line XXXI—XXXI of Fig. 28.

Fig. 32 is a left side elevation of the stamp cap, with cover and protecting hood for guiding the stamps removed.

Fig. 33 is a left side elevation of the elements on the right side wall of the stamp cap.

Fig. 34 is a front end view on a larger scale showing the severing device.

Fig. 35 is a side elevation of Fig. 34.

Fig. 36 is a rear end view of Fig. 34.

Fig. 36a shows the individual parts in a second operative position.

Fig. 37 is an enlarged top plan view of the stamp guide.

Fig. 38 is a bottom plan view of Fig. 37.

Fig. 39 is a longitudinal section of the stamp guide on line XXXIX—XXXIX of Fig. 37.

Fig. 40 shows a locking device for the stamp cap.

Fig. 41 shows a stamp strip.

The form of construction illustrated in Figs. 1 to 7 may be employed, for example, for selectively affixing on mail "registered" labels and "express" labels or any other kind of labels, such as are used in postal service, and for separately recording the delivery of the labels. The apparatus comprises a casing 1 open on the greater part at the top and bottom and closed at the rear by an easily removable cover 2. A small compartment is formed in the front portion of the casing 1 by a partition 3, and accessible from the front after the removal of an easily removable cover 4. The cover 4 in the apparatus is constructed as an insertable cover which is held at its upper edge by a snap lock comprising a projection 5 and a spring 6, and the cover 4 can be liberated by depressing a button 7 on the spring 6 (Fig. 1). According to the width of the casing 1 one or several boxes 8 can be inserted therein from the rear and from the top, which boxes, when several are employed, lie directly side by side between the side walls of the casing 1. The boxes 8 are open at the front and provided on one side with a cover 9 (Fig. 2) fixed by screws and preferably adapted to be sealed. Each of the boxes 8 has a separate stationary cap 10 in which a reel 12 carrying the rolled label or stamp strip 11 can be inserted, and also the device serving for unwinding, severing and affixing the labels or stamps. Each reel 12 has a core 13 designed to be slipped on to a hollow axle 14 fixed in the cap 10 on the closed wall of the box 8 and is freely rotatable on this axle, the core being then secured in position by a pin 15 fixed on the cover 9 and pushed into the hollow axle 14 during the application of the cover 9.

The device for unwinding, severing and affixing the stamps is constructed in the following manner: A drum constructed as driving device is composed of two lateral circular discs 17 and a core 18 of slightly smaller diameter than the discs and rotatably mounted on an axle 16 fixed in the side walls of the box 8. The core 18 has in the middle of its wall an annular milled recess 19 (Fig. 4) bordered by the thicker ends 20 of the core. (In Figs. 1 and 2 the drum 17, 18 is shown somewhat more simple for the sake of clearness.) The thicker ends 20 (according to Fig. 1 together with the whole core 18) cooperate with a pressure roller 21 which engages between the discs 17 and comprises a core 22 covered with a layer of rubber or the like. It is rotatable on an axle 23 which is mounted in a fork 24.

This fork 24 is fixed on the lower end of a bolt 26 (Figs. 1, 5, 6) and secured against rotation by any suitable means. To enable the pressure roller to be lifted from the drum 17, 18 for a purpose which will be hereinafter described, a sleeve 26 rotatable in two bracket arms 27 fixed on the wall of the box 8, is slipped on to the bolt 25 and rests with its lower end on the fork 24. A spiral spring 29 bearing against a disc 28 on the sleeve 26 tends to always move the sleeve 26 and consequently the pressure roller 21 into their lower extreme position (Fig. 1). The upper end of the sleeve 26 projects through the upper wall of the box 8 and carries a small hand crank 30 by means of which the sleeve 26 can be rotated without the fork 24 and the pressure roller 21 participating in this movement. A ring 31 is fixed on the upper bracket arm 27 at a point concentric to the centre of the sleeve 26 and a horizontal pin 32 projecting from the sleeve 26 bears on the inclined upper surface of this ring 31. If the sleeve 26 is turned by means of the crank 30, the pin 32 slides upwards on the inclined surface of the ring 31 and thus lifts the sleeve 26 against the action of the spring 29 until the pin finally comes into contact with a vertical pin 33 of the ring 31 and thus limits the stroke of the sleeve 26 and of the pressure roller 21. By turning the crank 30 in the opposite direction, the pressure roller 21 is again brought into contact with the drum 17/18.

A beak-like guide 34, fixed on the cap 10 in front of the delivery slot for the label- or stamp-strip 11, projects into the angle formed between the drum 17/18 and the pressure roller 21. The label or stamp strip 11 unwinding from the reel 12 slides along this guide 34 and is fed to the contact line of said drum and roller in order to be gripped therebetween and unwound from the reel 12. On the edges 20 of the drum core 18 small pins 35 are mounted on at least a portion of the circumference, and engage in corresponding annular grooves 36 in the pressure roller 21 ensuring thus a reliable gripping and pulling of the label strip 11. The drum core 18 is, in the example illustrated in Fig. 1, of such diameter that a portion of the strip corresponding exactly to the length of one label is pulled off the reel 12 during half a rotation of the drum 17/18, whereas the pressure roller 21 performs a complete revolution during this movement. The ends 20 of the core 18 are slightly recessed at two diametrically opposite portions 37 so that, when these portions are under the pressure roller 21 neither the pressure roller 21 is rotated nor the label strip 11 pulled off the reel 12.

The pressure roller 21 has on one of its side faces a pin 38 which oscillates at every rotation of the roller 21 a lever 39 of a step by step counting mechanism 40 and feeds this mechanism one step. After the pin 38 has passed the control lever 39 is returned into its initial position in known manner by means of a spring. As the counting mechanism 40 is thus operated each time a label is delivered, the number of labels delivered is accurately recorded.

When a label has been unwound from the reel 12, it is severed exactly from the label strip 11 at the prescribed length. For this purpose transverse blades 41 (Fig. 1) are arranged one at each of two opposite points in the drum core 18 and mounted on one or several shanks 42. These shanks are radially shiftable in corresponding bores in the core 18 and at their inner ends each one, under the action of a spiral spring 43 which bears at one end against a disc 44 and at the other end against the bottom of a segment-shaped cover 45 serving for guiding its respective blade 41, bears against the bottom of an annular groove 46 provided in the axle 16. A small cam 47 is provided in the annular groove 46 at the upper side of the shaft 16, which forces the blade shank 42 actually sliding thereover to move radially outwards and to thus press its respective blade 41 against the label strip 11 unwound from the reel 12.

Thus, the front edge of the strip pressed on to the pins 35, for which the rubber covering of the pressure roller 21 opposite the blade 41 serves as yieldable counter bearing, is sharply severed and participates alone in the rotation of the drum 17/18, whereas the label strip proper remains stationary because a recessed portion 37 of the core ends extends directly from each of the blades 41. Only when the normal portion of the end 20 again comes into contact with the pressure roller 21 is the label strip 11 again unwound from the reel 12.

Shortly before the severed label is lifted from the drum 17/18 in a manner which will be described and stuck on the latter or the like, it is moistened on its outwardly directed rear side by means of a small felt roller 48 (Fig. 1). The necessary moisture is supplied by a liquid container 49 comprising a drum with perforated wall and surrounded by a yarn winding 50 or the like. The axles or journals of both the felt roller 48 and the moisture container 49 rest in bearing slots of a rocker frame 51 in which they are held by pressure exerted by springs (not shown) so that they are permanently in contact with one another. The rocker frame 51 rests with its journals 52 in horizontal or slightly inclined open slots of two bearings 53 fixed on the inner walls of the casing 1 and it is held by a nut 54 of a screw 55 which is hingedly mounted on the partition 3 and can be inserted in a vertical slot 56 (Fig. 1) in a transverse bridge 57 connecting the two cheeks of the rocker frame 51. The more the nut 54 is tightened, the more the lower end of the frame 51 will swing towards the drum 17/18 and press the felt roller 48 against this drum. When the pressure necessary for sufficiently moistening the label has been attained, the rocker frame 51 may be secured in its position by two screws 58 which are each rotatable in a block 59 of the rocker frame cheeks and are each pressed tightly against a supporting bracket 59 fixed on the adjacent side wall of the casing 1. The frame 51 is thus clamped so that it cannot move.

The supply of water to the liquid container 49 is effected through one of its journals.

After the moistening of the rear side of the label or stamp it is removed from the drum 17/18 and affixed on the letter or other piece of mail. For this purpose a small pressure roller 61 is mounted freely rotatable on an axle 62 in the box 8 directly behind the drum 17/18. Two two-armed levers 63 are also rotatably mounted on the axle 62 one on each side of the pressure roller 61. These levers are interconnected at the front ends by a scoop-like bridge 64 and each loaded at the rear end by a spring 65. The springs 65 press the front edge of the bridge 64 permanently against the wall of the drum core 18 or against the bottom of the recessed portion 19 (Fig. 4). If the drum 17/18 is turned so that the front edge of the severed label approaches the scoop-shaped bridge 64, the label slides on to the wedge-shaped bridge 64 and is thus automatically lifted off the pins 35 or off the ends 20 of the drum, whereupon it slides under the pressure roller 61 which presses it tightly on to the letter.

As already mentioned, the drum 17/18 and the pressure roller 21 are of such diameters that the length of the end of the label strip actually to be unwound from the reel is in a predetermined proportion to the angle of rotation of these two elements. In the form of construction illustrated in Figs. 1 and 2 this proportion is, for example chosen so that a length of the label, (in the present instance a long narrow strip like a "registered" label is imagined), corresponds to half a rotation of the drum 17/18 and to a complete rotation of the pressure roller 21. It is evidently necessary for the apparatus to be automatically locked after the delivery of a label or stamp in order to prevent the further rotation of the drum 17/18 and the sticking of a second label or stamp on the same letter or mail piece. For this purpose the following locking device is provided:—According to the division of the drum 17/18 it is provided on one of its side faces with one or several pins 66, into the path of which the point of a small two-armed lever 67 projects which lever is pivotally mounted on the adjacent wall of the casing 1. The rear end of this lever 67 has a pin 68 which engages in a guide slot in the eye-shaped lower end 69 of a rod 70, which is vertically shiftable in two small angle pieces 71 and loaded by a spiral spring 72 in such a manner that it always tends to move downwards and to bear against a stop 73. The pin 66 in passing swings the lever 67 into the position shown in dot-dash lines and thus causes the rod 70 to move upwards against the action of the spring 72. Generally, however, the shifting of the rod is prevented by the following arrangement: A small lever 74 adapted to be lifted or lowered is mounted in the path of the rod 70 on the roof of the front compartment separated from the rest of the casing by the partition 3 (Figs. 1 to 3). The pivot pins of this lever 74 are rotatable and shiftable in slots of two bearing eyes 75. These pins form blocks 76 approximately of rhombic shape one on each side of the lever 74 and on each of these blocks a blade spring 77 bears in such a manner that the lever 74 is resiliently held either in its vertical locking position (Fig. 1) or in its releasing position (Fig. 3) shown in dot-dash lines in Fig. 1, so that this lever can only be moved into the one or other of these two positions by overcoming a certain resistance. If the lever 74 is raised out of its released position (Fig. 3) into its locking position (Fig. 1), its lower end passes downwards through a slot 78 (Fig. 2) in the roof of the casing and thus comes into the path of the rod 70 so that this rod cannot be shifted upwards. Thus, the lever 67 remains in inoperative position (Fig. 1) and prevents a further rotation of the drum 17, 18 when the pin 66 of this drum bears against the lever. If, however, the lever 74 has been turned by hand into its releasing position (Fig. 3), the drum 17/18 can continue to rotate unimpeded also after one of the two pins 66 has encountered the lever 67, and thus effects the unwinding of a corresponding length of the label strip. During this rotation the lever 67 merely yields into the position shown in dot-dash lines and thus lifts the rod 70. This rod has at its upper end a lateral bayonet shaped extension 79 which extends through a small slot in the casing roof up to the folded over lever 74. If the rod 70 is raised, its extension 79 participates in this movement, pushes the upper arm of the lever 74 in upward direction and thus returns this lever into its locking position (Fig. 1). After each delivery of a label or stamp the apparatus is thus automatically locked against further use and is only again operative after the lever 74 has been swung over into its releasing position (Fig. 3) by hand.

The rotation of the drum 17/18 necessary for the delivery of a label or stamp is effected by pushing the whole casing 1 together with the boxes 8 mounted therein over the letter or the like to be stamped, by exerting a slight pressure on the casing by hand. The drum 17/18 and therewith also all other parts of the apparatus should, however, only become operative after the whole apparatus has been correspondingly adjusted. For this purpose the following arrangement is provided: The lower edge of the discs 17 of the drum 17/18 projects downwards through an aperture in the bottom of the box 8; the lower portion of the pressure roller 61 also projects through the bottom of the box 8. However, the box 8 is slightly lower than the casing 1 and is usually held in its upper extreme position shown in Fig. 1 by a pressure spring 82 bearing against a step 80 formed in the box 8 and guided on a pin 81 projecting upwards from the casing 1. The upper portion of the rear wall of the box has two bores 83 in which a pin 85 fixed on a spring 84 and slidable in a hole in the casing cover 2 can engage. When the box 8 is in inoperative position (Fig. 1), the pin 85 engages in the lower of the two bores 83 and thus locks the box in this position in which the lower portions of the drum 17/18 are situated so high above the plane of the casing bottom that, even in the event of the casing 1 being pushed over a flat support, they cannot come into contact therewith and consequently cannot be rotated. If it is desired to use the apparatus, the locking pin 85 must first be pulled out of the lower bore by means of the spring 84 and the box 8 pressed downwards into the casing by exerting a vertical pressure thereon by hand, until the locking pin 85 snaps into the upper bore 83 and thus locks the box 8 in its operative position. The bases of the lowermost points of the drum 17/18 and of the roller 61 then project so far beyond the plane of the casing bottom as shown in dot-dash lines in Fig. 1, that the drum and the pressure roller will be rotated in anti-clockwise direction if the apparatus is pushed along a flat surface. A toothed wheel 86 on the end of the drum cooperating with a spring controlled pawl prevents the drum 17/18 from rotating in backward direction.

The apparatus illustrated in Figs. 1 to 6 is operated in the following manner: After removing the cover 9, a reel 12 with a strip of labels or stamps 11 wound thereon is first inserted in the cap 10 and the outer end of the strip is pulled through the lateral cap slot, provided for this purpose, until it lies flat on the guide 34 with its front edges projecting slightly beyond this guide, so that the strip edge engages in the angle formed between the drum core 18 and the pressure roller 21. A braking device not shown in the drawings prevents accidental changes in the position of the strip end towards the front or rear. After the cover 9 has been again closed and the box 8 placed in the casing 1, the apparatus is ready for use. When it is desired to use the same, the box 8 in question is first pressed downwards into the operative position, whereupon the lever 74 normally in inoperative position is moved into its releasing position (Fig. 3) and the pressure roller 21 brought into contact with the drum 17/18 by turning the crank 30. If the apparatus is then placed on the letter or the like to be stamped and pushed with the hand slightly forward, the discs 17 of the drum 17/18 and the pressure roller 61 will roll on the support. Owing to the rotation of the drum 17/18 the pressure roller 21 is also rotated so that a corresponding length of the label or stamp strip 11 is pulled off the reel 12 and severed by the blade 41 which is actually uppermost; the severed label is then moistened by the felt roller 48, lifted off the drum 18/18 by the scoop-shaped stripping device 64 and finally affixed on to the letter or the like by the pressure roller 61. During these operations the step-by-step counting mechanism 40 is fed one step and finally the lever 74 previously thrown over is again brought into its upright locking position (Fig. 1) by the cooperation of the roller journals 66, the lever 67, the rod 70 and its extension 79, the apparatus being thus provisionally locked against further use after the delivery of the label. As above mentioned, the apparatus can only be returned into its operative position by again oscillating the lever 74. When the apparatus is no longer required for use, the spring 84 with the pin 85 is pulled back and the box 8 actually used is automatically returned into its inoperative position under the action of the pressure spring 82 and is again locked in this position by the pin 85 engaging in the lower bore 83.

The form of construction illustrated in Figs. 7 to 40, having a much greater efficiency than the apparatus above described, serves also for cancelling the stamps, marking the place and time of issue and the owner of the apparatus, printing a control mark, for example a number on the stamp and letter, recording not only the number but also the value of the stamps used, and if necessary for printing on the letter the balance of the stamps still in the machine. This form of construction is also characterized in that an unauthorized withdrawal of stamps from the open apparatus is renderd impossible by locking devices.

In this form of construction of the machine all the internal parts are also accommodated in a casing 87 having the shape illustrated in the longitudinal section in Fig. 7 and closed at its front end by a removable door 88 (Fig. 8) and at its rear end by a hinged door 89. The left side wall of the casing is easily removable for the purpose of removing the mechanical drive and is secured by means of four screws on corresponding lugs 90 (Fig. 7) of the casing 87. It carries on its upper edge a curved plate 91 for inserting the thumb, whereas on the right side wall of the casing 87 an inclined gripping bar 92 is fixed under which the tips of the middle, third and little finger of the right hand, can engage for operating the machine. A knob 93 arranged in front of the gripping bar 92 must be inwardly pressed with the index finger of the right hand for liberating the mechanical drive before the commencement of every mechanical operation.

The mechanical drive is mounted in a frame which comprises a left side part 94 (Figs. 7, 9, 15, 18), a right side part 95 and two cross bars 96 and 97. The right side part 95 is fixed by screws 98 directly on the inner surface of the right casing wall, whereas the left side part 94 is secured by screws 99 to an angle bar 100 of the casing front end wall and to small lugs of the casing rear end wall. In the lower part of the frame 94, 95 an axle 101 is nonrotatably mounted around which a pressure drum 102 can rotate freely. The pressure drum 102 projects so far through a square hole in the bottom of the casing that it rolls over a smooth surface when the machine is pushed forward. Every time the machine is used, the pressure drum 102 in this manner performs a complete revolution and is then automatically locked in the manner hereinafter described. The machine can only be used again, if the locked drum 102 is again liberated by exerting pressure with a finger on the knob 93. For this purpose the following arrangement is provided:—

On the inner surface of the left side part 94 of the frame a U-shaped strap 103 (Figs. 9, 10, 15) is fixed, and a forked push rod 104 is vertically shiftable through apertures in the arms of this strap. A pressure spring not shown in the drawings tends to continually press this push rod 104 downward and to thus hold it in the inoperative position shown in Figs. 10 and 15. The lower end of the push rod 104 bears against a pin 105 of a small two-armed locking lever 106 which is pivotally mounted on a pin 107 on the left side part 94 of the frame, its left end (Fig. 15) projecting into the path of a pin 109 fixed in the left side wall of the pressure drum 102. If the drum 102 is rotated by pushing the machine in the direction of the arrow, the pin 109 swings the locking lever 106 in anti-clockwise direction and thus imparts a corresponding stroke to the push rod 104. After the passage of the pin 109, the spring then presses the push rod 104 and the locking lever 105 back into the locking position (Fig. 15).

The free end of a second, but horizontal U-shaped strap, fixed on the inner surface of the right side part 95 of the frame, bears against the upper arm of the U-shaped strap 103 and serves as bearing for a shiftable rod 111. A tension spring 113 engaging a nose 112 on the rod 110 tends to maintain this rod 111 in the locking position shown in Fig. 10, in which a nose arranged on the free end of the rod 111 engages in the forked front end of the rod 104, thereby preventing it from being shifted by the pressure drum pin 109 and the locking lever 106 (Fig. 15).
When the rods 111 and 104 are in this position, the pin 109 is blocked by the locking lever 106 that is, the pressure drum 102 is locked against rotation in the direction of the arrow so that the machine cannot operate.
On the upper surface of the U-shaped strap 110 a blade spring 115 is fixed which carries on its free end a nose 116 (Figs. 7, 9, 10). When the rod 111 is in its locking position (Fig. 10) the nose 116 resiliently bears against the upper edge of the rod 111. If, however, the rod 111 is moved out of its position of rest into the position shown in Fig. 10a by exerting pressure on the knob 93, the nose 116 drops into a notch 117 in the rod 111 and thus prevents it from returning into its locking position. As, when the parts are in this position, the nose 114 no longer rests in the forked upper end of the rod 104, the locking lever can yield to the pressure of the pin 109 during the rotation of the pressure drum 102, that is, the pressure drum is released and the machine is ready for operating. If the pressure drum 102 is now rotated and the locking lever 106 swung outwards by pushing forward the machine, the rod 104 is lifted, its upper end engages under the nose 116 and lifts this out of the notch 117. The rod 111 now returns into its initial position under the pull of its spring 113, whereas directly thereafter the pin 109 liberates the locking lever 101 and thus allows this lever and the rod 104 to return into their initial position under the pressure of the rod spring. The nose 114 of the rod 111 then again engages in the forked upper end of the rod 104 and again locks this rod and the locking lever 106 in their locking position. The pressure drum 102 can, however, complete the rotation which it has commenced but is then locked against further rotation because its pin 109 encounters the non-yielding locking lever 106. Only by again depressing the knob 93 can the pressure drum 102 be once more liberated and the machine made ready for a further operation.

On the right side wall 118 (Figs. 10, 19 and 20) of the pressure drum 102 a toothed wheel 112, a ratchet wheel 120 and a ring 121 are mounted, this ring having a cut out portion 122 directed rearwardly when the pressure drum 102 is in the inoperative position. The purpose of the toothed wheel 119 and of the ring 121 will be hereinafter described. A two-armed pawl 123 engages in the ratchet wheel 120 under the action of a tension spring 124 in such a manner that the drum 102 is prevented from rotating in the direction opposite to that indicated by the arrow.

The stamps to be delivered by the machine are accommodated in the form of a long rolled band in a cap or casing 125 (Figs. 28 to 33) which has on the right hand side a forwardly directed box-shaped extension 126. As already mentioned above, stamps of any value can be delivered by the machine. The stamps of the same value are united to a strip or band 127 (Fig. 41) which upon payment of a corresponding amount can be bought at any desired length at the post office. For each stamp value a separate accordingly designated cap 125 must be installed. The cap shown in Fig. 28 is for instance designed exclusively to accommodate stamps in the value of five units, i. e. 5 cents, 5 pfennigs and the like. If, after the stamps of a certain value have been delivered, stamps of another value have to be used, the cap 125, which has been used, must be removed from the machine and replaced by a cap filled with stamps of the other value. With this object in view the folding door 89 arranged on the rear wall of the casing 87 is opened, the cap 125 which has been used before is pulled out by means of a handle 128 and instead of the same another cap is inserted into the machine, whereupon the door 89 is closed again. For the secure guiding and locking of the cap actually used in the machine the following arrangement is provided:—

The right hand side part 95 of the frame (Figs. 9, 18) has on its rear portion on the inner surface two horizontal guide bars 129, whereas the left frame part 94 (Figs. 9, 15) has on its inner surface two angular pressing springs 130 slightly inclining in a horizontal plane in forward direction. On the right side face of each stamp cap 125 and the extension 126 of the same (Fig. 29) a guide bar 131 is fixed the height of which corresponds accurately to the distance between the two guide bars 129. If the cap 125 is slipped into the machine, the springs 130 press upon the lid 132 of the cap in such a manner that the rounded point of the cap bar 131 inserted between the guide bars 126 slides between these guide bars in forward direction. Above the guide bars 129 a two-armed lever 133 is arranged on the right hand frame part 95 (Fig. 18), the rear nose-shaped end 134 of which lever extends through a corresponding aperture of the upper guide bar 129, whereas its front end bears against the rearwardly directed arm of a three-armed lever 135 which is also pivotally mounted on the right hand frame part 95 and permanently influenced by a pull spring 136. If a stamp cap 125 is slipped into the machine, its bar 131 (Fig. 29) forces the nose 134 (Fig. 18) upwards, swings the lever 133 and thus causes the three-armed lever 135 to turn in clockwise direction (Fig. 18). Thus, the hooked end 137 of the rearwardly directed arm of this lever 135 engages in a corresponding aperture 138 in the upper guide bar 129, whereas at the same time a lateral nose 139 on its downwardly directed arm engages in the above mentioned aperture 122 in the ring 121 (Fig. 19). This is, however, only possible as long as the pressure drum 102 is in its resting position. If this is not the case, but the pressure drum has already commenced its rotation, the aperture 122 of the ring 121 is no longer opposite the lever nose 139, and this nose bears against the ring 121 as soon as the lever 133 endeavors to oscillate the three-armed lever 135. The levers 133 and 134 are then locked in their inoperative position (Figs. 18, 19), and consequently cannot be moved by the cap bar 131. The nose 134 of the lever 133 therefore blocks the guide path for the cap bar formed by the guide bars 129, and prevents a cap 125 from being inserted until the pressure drum 102 has completed its rotation and returned into its position of rest. If, however, a cap 125 has been inserted in the machine when the pressure drum 102 is in its correct resting position, the levers 133 and 135 have been able to perform the above described movements, and if the pressure drum 102 commences its rotation in the direction of the arrow, when the machine is pushed forward, the nose 139 of the three-armed lever 135 resting in the aperture 122 of the ring 121 slides inwards on the bevelled lower bordering surface of the aperture 122 towards the middle of the ring 121 and thus effects a continuation of the already commenced lever rotation. The nose 137 of the rearwardly directed arm of the lever 135, which had just engaged in the aperture 138 of the upper guide bar 129 but not yet passed therethrough, drops into the guide path of the cap bar 131 and engages in a notch 140 in this guide bar (Fig. 29) so that it is not possible to pull the cap 125 out of the machine. As the nose 139 (Figs. 18, 19) of the downwardly directed arm of the lever 135, and consequently the lever itself, is held in the swung out position last described, during the entire rotation of the pressure drum 102, the cap 125 actually inserted is locked against intentional pulling out until the pressure drum 102 has again assumed its resting position. The nose 139 then again engages in the aperture 122 in the ring 121, whereas the nose 137 of the rearwardly directed lever arm 135 returns into the aperture 138 of the upper guide bar 129 and thus again liberates the guide path for the cap bar 131. If the cap 125 is again removed from the machine, the levers 133 and 135 return into their inoperative position (Fig. 18).

At each delivery of a stamp its value is to be added in a value adding mechanism, and at the same time the emission of the stamp recorded in a step-by-step counter irrespective of its value. The value adding mechanism should therefore always indicate the total value and the step-by-step counter the number of stamps used. For this purpose the following arrangement is provided:—

A bracket 142 is fixed on an angle piece 141 (Figs. 7, 9, 18) bent at right angles, on the right side part 95, in which bracket both a step-by-step counter 143 and also a value adding mechanism 144, both of well-known construction, are mounted. The step-by-step counter 143 is actuated each time a spring-loaded control arm 145 is swung outwards, whereas the value adding mechanism is actuated by the more or less great angle of rotation of a toothed wheel 146. The box-shaped extension 126 of each stamp cap 125 (Figs. 28, 30, 33) carries on the inner side of its right side wall a double gear comprising a small toothed wheel 147 and a slightly larger disc 148 rigidly connected therewith. The disc 148 is provided on its edge with a plurality of teeth corresponding to the actual stamp value and on its right side face with a pin 149. As long as the cap 125 is not inserted in the machine, the double gear 147, 148 is locked against rotation in the manner hereinafter described. However, as soon as the cap is properly slipped into the machine, the double gear 147, 148 is automatically released and coupled with a toothed wheel gearing comprising two toothed wheels 150, 151 (Figs. 7, 18, 19) and driven by the drum 102. The toothed wheels 150, 151 are mounted on the inner side of the right part 95 in the plane of the already mentioned pressure drum toothed wheel 119 and have the same diameters as the toothed wheels 119 and 147. Whereas the toothed wheel 150 meshes permanently with the toothed wheel 119 of the pressure drum 102 on one side and with the toothed wheel 151 on the other side, the toothed wheel 147 only meshes with the toothed wheel 151 when its coordinate cap 125 is properly inserted. The toothed segment disc 148 (Figs. 7, 28, 33) then lies in the plane of the small toothed wheel 146 serving for driving the adding mechanism 144 (Figs. 7, 9), whereas the pin 149 of the toothed segment disc 148 lies in the plane of the control arm 145 (Figs. 9, 18) serving for driving the step-by-step counter 143. If the pressure drum rotates, the toothed wheels 119, 150, 151, 147 and the toothed segment disc 148 also participate in the rotation in the direction of the arrows. During this rotation the teeth of the toothed segment disc 147 come into mesh with the driving toothed wheel 146 of the value adding mechanism 144 and feed the same as many units as the value of the stamp actually delivered (that is in the example illustrated "5"), whereas shortly thereafter the pin 149 (Figs. 29, 33) swings out the control arm 145 of the step-by-step counter 143 (Figs. 9, 18) in anti-clockwise direction and thus shifts on the counter by one unit. At the end of each rotation of the pressure drum the double gear 147, 148 again assumes the position of rest indicated in Fig. 33, in which it is immediately again locked by the pulling out of the stamp cap 125 from the machine. Consequently, during the removal of the cap from the machine, the double toothed wheel cannot be shifted and is therefore always in the position necessary for the proper engagement of the toothed wheel 147 in the coupling toothed wheel 151. During the rotation of the pressure drum 102 a stamp, which has been severed during the preceding operation from the stamp strip 127 of the inserted cap 12 and moved along by the pressure drum in a manner which will be hereinafter described is first moistened and then stuck on to the letter to be stamped. The moistening of the stamp which, its picture side facing the pressure drum, is held by four small spikes 152 (Figs. 21, 22, 24) of the wall of the pressure drum, is effected by a moistening device which is constructed as follows:—

The front cross bar 96 (Figs. 9, 10, 15) is extended upward and carries on this extension two forked-shaped guides 153 bent forward at right angles. After the removal of the inserted door 88 (Fig. 8) a water container 154 can be slipped between these guides 153 and, resting with a pin 155 on each side in one of the forked guides 153, it can oscillate in this manner in the longitudinal direction of the machine. Each side wall of the water container 154 is extended at its lower end to form a rearwardly and downwardly inclined arm 156 (Figs. 7, 13, 14, 19). A moistening roller 157 made of felt or the like is arranged between the arms 156 and rigidly mounted on a hollow axle 158. This axle, where it is covered by the moistening roller 157, is perforated like a sieve and rotates freely on a screw pin 159 of the right arm 156 and on a hollow pin 160 of the left arm 156. The water container 154 is connected by means of a small tube 161 with the hollow pin 160 in such a manner that, under certain circumstances hereinafter explained, the water filled into the container can flow through the tube 161 and the hollow pin 160 into the hollow axle 158 and saturate the moistening roller 157 with water through the perforations. The right container arm 156 carries a small roller 162 which permanently bears against the edge of the right side wall 118 of the pressure drum under the weight of the water container 154. This side wall, as shown in Fig. 19, is constructed as a cam disc. As long as the roller 162 rests on the full edge of the side wall 118, which is the case when the pressure drum 102 is in its inoperative position and during the remaining four fifths of its rotation, the water container 154 is held by the guide roller 152 in the inoperative position shown in Fig. 7, in which the moistening roller 157 is not in contact with the wall of the pressure drum. However, as soon as the pressure drum 102 commences to rotate, the roller drops into the edge recess in the side wall 118 shown in Fig. 19 and thus enables the water container 154 to swing towards the rear under the action of gravity. During this movement the moistening roller 157 presses lightly against the wall of the pressure drum 102 and during the first fifth of the rotation of the drum moistens the rear gummed side of the stamp moving under the moistening roller and held by the pins 152 (Figs. 21, 22, 24). In order to prevent the pins 152, which are slidable in the drum wall, from being pushed back by the moistening roller 157, two annular grooves 163 (Fig. 13) are provided in the moistening roller and ensure a free passage for the pins 152 when the moistening roller 157 is rolling on the drum wall. As soon as the stamp has passed the moistening roller 157, the roller 162 again slides on to the full edge of the pressure drum side wall 118 (Fig. 19) and thus guides the water container 154 and the moistening roller 157 back into the inoperative position (Figs. 7, 19), in which they remain until the commencement of the next rotation of the pressure drum.

In the event of continual water flow to the moistening roller 157, there is a danger of this roller being moistened too much so that the machine is soiled. In order to avoid this, an automatic valve is arranged on the upper surface of the water container 154 and allows the admission of air into the water container only for a short instant or two short instants during each operation of the machine, but which normally maintains the container air-tightly closed and thus prevents all discharge of water from the container. The valve comprises a circular bearing plate 163 (Figs. 9, 11, 12) which is soldered on the water container 154 and has a small ventilation hole 164. In the middle of the bearing plate 163 there is a vertical pin 165 on to which the hub 166 of a valve disc 167, freely rotatable on the bearing plate 163, is slipped. The valve disc 167 also has a small hole 168, which, however, is so arranged that, when the valve disc 167 is in inoperative position, it does not accurately register with the ventilation hole 164. This ventilation hole is therefore initially closed, that is no air can enter the water container and consequently no water can flow out of the container through the pipe 161 (Fig. 14). If, however, the valve disc 161 is turned in clockwise direction (Fig. 11), the hole 168 slides over the ventilation hole 164 and allows air to pass into the water container for a short instant to cause a few drops of water to flow through the tube 161 to the moistening roller 157. This also occurs again when the valve disc 167 returns into its inoperative position, provided the angle displacement between the holes 164 and 166 is chosen so great, that it corresponds exactly to the angle of rotation of the valve disc 167; the ventilation hole 164 is then only exposed once, but it may be kept open as long as desired, because, as will be hereinafter described, the period during which the valve disc remains in swung-out position, is dependent upon the interval between the depressing of the knob 93 (Figs. 8 to 10) and the commencement of the pressure drum rotation. The valve disc 167, as shown in Fig. 11, is provided with an edge recess, one end of which, when the valve disc 167 is in its inoperative position, bears against an abutment pin 169 or an upwardly bent nose on the bearing plate 163, whereas the other end of this recess may, if desired, serve for limiting the turning of the valve disc. On the upper end of the hub 166 a lug 170 is fixed which, together with the valve disc 167, rigidly connected therewith, is continually acted upon by a torsion spring 171 and consequently always tends to assume its inoperative position. The downwardly directed nose of an arm 173 cooperates with the lug 172 and, being rigidly connected to the rod 111, consequently participates in the movements of the rod. If the knob 93 of the rod 111 is pressed inwards for liberating the operating of the machine, the nose 172 of the arm 173 moves the lug 170 and consequently also the valve disc 167, against the pressure of the loading spring 171, into the position shown in dot-dash lines in Fig. 11, in which position the said parts remain as long as the rod 111 is locked by the resilient nose 116 (Fig. 10a). As soon as the pressure drum 102, however, commences its rotation, the rod 111 is again automatically liberated and returns into its inoperative position (Figs. 9, 10) together with its arm 173, whereupon also the lug 170 and the valve disc 167 automatically return into the inoperative position by the action of the torsion spring 171. The friction between the bearing plate 163 and the valve disc 167 can be increased or decreased by more or less tightening the pin 165 constructed as a screw. Consequently the duration of the air admission can be regulated as required. An aperture adapted to be closed by a screw cap 174 (Fig. 9) serves for filling fresh water into the container 154.

The stamp caps 125 and 126 (Figs. 28 to 33) are constructed in the following manner:—

In the centre of the box-shaped cap 125 a pin 175 is arranged, which is fixed on the right side wall of the box-shaped cap extension 126 and projects freely through an aperture 177 in the side 176 of the cap 125. Between the right side wall of the cap extension 126 and the cap side 176 a ratchet wheel 178 is freely rotatable on a pin 175, the hub of this wheel having two lugs bent at right angles and projecting freely, like the pin 175, through the central aperture 177 in the cap side 176 into the interior of the cap 125. The hub 180 of a drum 181 is also rotatable on the pin 175, the side 182 of this drum having supports which bear against the side 176 of the cap 125, and a plurality of holes 183 arranged in a circle. If, when the cap cover 132 is removed, the hub 180 of the drum 181 is slipped on to the pin 175, the two lugs 179 provided on the ratchet wheel 178 engage in two diametrically opposite holes 183, the drum 181 being slightly turned if necessary, and thus couple the drum 181 with the ratchet wheel 178. Consequently the drum and ratchet wheel must always rotate together as long as they are coupled by the lugs 179. A pawl 184 cooperates with the ratchet wheel 178, is rotatable about a pin 185 arranged between the double gear 147, 148 and the ratchet wheel 178 and engages in the ratchet wheel 178 under the action of a pull spring 186 as soon as the stamp cap 125 is removed from the machine. If, however, the cap is slipped into the machine, the finger-shaped lower end 187 of the pawl 184 bears against a rigid abutment 188 (Fig. 33) of the side part 95 of the frame with the result that, during the last portion of the cap movement, the pawl 184 swings out in anti-clockwise direction and is thus pulled out of the ratchet wheel 178. When the pawl 184 is in this position, the ratchet wheel 178 and the drum 181 can turn either in the one or other direction. When, however, the pawl 184 engages in the ratchet wheel 178 (Fig. 33) as when the stamp cap 125 is pulled back, it is only possible for the ratchet wheel 178 and the drum 181 to turn in clockwise direction.

A second pawl 189 also pivotally mounted on the pin 185, serves to lock the double toothed wheel 147, 148 in the inoperative position shown in Fig. 33, immediately after the removing of the stamp cap 125 out of the machine has begun and, as already mentioned, to thus ensure the proper engagement of the toothed wheels 147 and 151 when the cap is being reinserted into the machine. For this purpose a nose 191 of the pawl 189, when the stamp cap is withdrawn, engages under the pull of a spring 190 (Fig. 33) into the actually undermost tooth gap of the toothed segment disc 148, and only releases the same when, on reinserting the stamp cap into the machine, the lower finger-like end 192 of the pawl 189 bears against a second rigid abutment 193 of the rigid side part 95 of the frame and thus causes the pawl 189 to turn in anti-clockwise direction.

The drum 181 of each stamp cap serves for winding a stamp strip or for accommodating the strip in already rolled condition. The inner end of the stamp strip 127 is, for this purpose, slipped into a vertical slit 194 (Fig. 32) in the drum 181 and clamped by an angular clamping device 195 rotatable on the drum hub 180. The stamp strip 127 is wound or slipped on to the drum in such a manner that it extends around the same from the inside to the outside in clockwise direction. The outer free end of the stamp strip is finally threaded through a horizontal slot 196 in the cap 125 into a guide formed by two U-shaped plates 197 198 (Figs, 32, 37 to 39) in which it is secured in the manner hereinafter described. By turning the drum 181 in anti-clockwise direction the rolled stamp strip 127 is, if necessary, pulled slightly tighter and thus correspondingly stretched. When this has been effected, one end of a paper strip 199 is placed on the left side surface of the guide 197, 198 and secured by placing a sleeve 200 in the shape of a match box cover on the guide 197, 198. The sleeve 200 is in turn secured against unauthorized removal by placing on the cap 125 the cover 132, the edge of which engages over a small nose on the sleeve 200 and thus prevents the removal of the sleeve. The right, arcuate enlarged end 201 of the paper strip 199 (Fig. 28) is folded towards the left before slipping on the the cover 132 and, after the closing of the cap 125 by means of the cover is placed thereover in such a manner that a hole 202 in the enlarged right end 201 of the paper strip 199 is exactly over the upper end of the pin 175. The hollow shank 203 (Fig. 31) of a flat head 204, which shank has a plurality of longitudinal slits and is therefore resilient, is slipped on to the pin 175 until small sharp noses of the resilient shank portion engage in a corresponding annular groove in the pin 175 and thus provisionally prevent a removal of the knob 204. A round hole 132a is provided in the middle of the cover 132 and has a diameter slightly larger than that of the knob 204. When the cap 125 is properly closed, this hole is covered by the paper strip end 201 and the knob 204 in the manner illustrated in Fig. 28. Owing to the slightly smaller diameter of the knob 204 it is nevertheless possible to remove the cover but only by tearing the paper strip 199 at some point. Consequently it is impossible for an unauthorized person to open a stamp cap removed from the machine and remove stamps without detection. The owner of the machine can himself only open the stamp cap by tearing the paper strip 199. If he wishes to remove the drum 181, for example for the purpose of putting in a fresh stamp strip, he must first remove the cover 132, then slightly lift the drum and thus press the conically tapered hub 180 of this drum from below into the hollow shank 203 of the knob 204. As this shank, as already mentioned, has several longitudinal slits and is therefore resilient, it will be spread through the upper end of the drum hub 180 so far that the above mentioned small noses disengage from the annular groove of the pin 175 and thus allow the removal of the knob 204, whereupon the drum 181 can be pulled off the pin 175.

Moreover, any attempt to remove stamps from a stamp cap 125 by pulling the stamp strip 127 out of the guide 197, 198, 200 would be frustrated because for this purpose a rotation of the drum 181 is necessary which is prevented by the above mentioned cooperation of the pawl 184 (Fig. 33) with the ratchet wheel 178. A small opening is provided in the cap wall directly in front of the finger-shaped lower end 187 of the pawl 184, through which opening the two abutments 188, 193 on the right side part 95 of the frame protrude into the cap 125 and can disengage the pawls 184 and 189. It would therefore be imaginable that an unauthorized person could conceive the idea of inserting a rod or the like into this opening and thus oscillate the pawl 184 so far that it liberates the ratchet wheel 178. This attempt would, however, fail because the pawl 184 would probably only swing out so far that a second locking nose 205 provided on its lower end would engage the ratchet wheel 178. At the same time, a hook 206 provided on the upper end of the pawl 184 would in this instance engage over the pin 149 of the toothed segment disc 148 and prevent this disc from turning if the pawl 189 is swung out by the above mentioned manipulation and its nose 191 should be disengaged from the tooth gap which it hitherto engaged. Like the pawl 184 the pawl 189 is provided with a locking nose similar to the nose 205 and with a hook corresponding to the hook 206, in order, in the event of the above mentioned manipulation, to prevent the liberation of the ratchet wheel 178 or of the toothed segment disc 148.

As soon as a stamp cap 125 is properly inserted in the machine, a length of the stamp strip corresponding to the height of a stamp is automatically pulled out of the cap every time the machine is operated, this length being then severed from the strip and subjected to a further treatment hereinafter described. For this purpose the following arrangement is provided:

A bell crank lever 208 is pivotally mounted on a pin 207 (Figs. 7, 9, 10, 15, 15a) on the left side part 94 of the frame, the lower arm of this lever being hinged to a horizontal link 209 and its upper arm to a vertical link 210. This link 210 is connected with the front end of a lever 211 pivotally mounted on a pin 212 on the side part 94, whereas the horizontal link 209 engages the rear end of an arm 213, which forms the rearwardly directed extension of a carriage 214. This carriage is shiftable on a rail 215 which is fixed on the front cross bar 96 by means of its front end bent at right angles. The lever 211 carries a guide roller 216 (Figs. 15, 15a) which engages in a cam groove 217 (Fig. 7) in the left end wall 108 of the pressure drum 102 and which, each time the machine is operated, causes the lever 211 to move downward out of its position of rest (Fig. 15) and then return into its initial position. Owing to the positive connection of the lever 211 with the elbow lever 208 and by this lever and the link 209, also with the carriage 214, this carriage is at the same time pulled towards the left on the rail 215 and then returned into its initial position (Fig. 15).

On the right side of the carriage 214 (Figs. 16, 17, 17a) an angle rocker element 219 is rotatable about a pin 218, the oscillations of this element being limited by two set screws 220 bearing against the carriage 214. A finger 221 on the rocker element 219 cooperates with a spring loaded pawl 222, also pivotally mounted on the right side wall of the carriage 214, in such a manner that the rocker element 219 is, at least to a certain extent, resiliently secured both in its position of rest (Fig. 17) and also in its downwardly swung position (Fig. 17a). The downwardly swinging movement of the rocker element 219 is attained by a pressure spring 223 fixed on the free end of the rail 215 the instant the carriage 214 has reached its extreme rearward position (Fig. 17a) in that this spring slides with gradually increasing pressure along the upper edge of the finger 221 rising towards the front.

The lower horizontal arm of the angle rocker element 219 carries a gripper arm 224 of the shape shown in Fig. 16, and has at the front end bent down at right angles in horizontal plane two small pins 225. As soon as the carriage reaches its rearmost position (Fig. 17a) and the rocker element 219 swings downwards, these two pins 225 engage in the actually foremost row of holes 226 (Fig. 41) of the stamp strip resting in the guide 197, 198 and consequently transport this strip, during the following return movement of the carriage 214 and the gripper arm 224, that is, the stamp strip 127 is pulled out of the cap 125 a length equal to one stamp because the stroke of the carriage 214 corresponds exactly to the height of a stamp. It is evident that, to enable the pins 225 of the gripper arm 224 to actually engage in the row of perforations 226, these perforations must be situated exactly below the pins 225 at the instant when the rocker element 214 and the gripper arm 224 swing downwards. This is attained by the following arrangement:

The two U-shaped guide plates (Figs. 37–39) of the stamp strip guide have each an aperture open towards the front, so that the actually foremost stamp of the stamp strip 122 is guided only on the side edges, whereas in the middle it is free at the top and bottom. In the flanges of the lower guide plate a small axle 227 is journalled which is loaded by a torsion spring (not shown) in such a manner that it and a swan neck plate 228 fixed thereon always tend to turn in anti-clockwise direction (Fig. 39). This is, however, normally prevented by the finger-like bent end of the plate 228 bearing with slight pressure against the under side of the actually foremost stamp. On the axle 227 a light bail 229 is freely rotatable and tends to rotate in anti-clockwise direction under the action of a second torsion spring 230. On the transverse arm of the bail 229 two small pins 231 are fixed which normally engage in two holes in the actually foremost row of perforations 226 of the stamp strip 127 resting in the guides 197, 198. The actually foremost stamp is thus normally held in a predetermined unchangeable position relative to the front edge of the guide 197, 198 and consequently, when the stamp cap is inserted, also relative to the parts of the machine drive. Only, when the bail 229 and therewith the pins 231 swing downwards, is the stamp strip 127 liberated and can be gripped and pulled forward the length of one stamp by the pins 225 (Figs. 16, 17) of the gripper arm 224 in the manner above described. To enable the pins 231 of the bail 229 (Figs. 37 to 39) to clear the guide path during the introducing of the front end of the stamp strip into the guide 197, 198, and to ensure that these pins really engage in the actually foremost row of perforations 226, the bail 229 is provided with a small forwardly extending finger 232, which engages under the finger-like end of the plate 228. If this finger is depressed with one finger of the hand holding the cap before introducing the front end of the stamp strip into the guide 197, 198, this pressure is imparted by the finger 232 also to the plate 228, and thus this plate is caused to swing in clockwise direction. The front end of the stamp strip is then pushed into the guide 197, 198 in such a manner that the foremost row of perforations 226 lies exactly over the pins 231. As soon as the plate 228 springs back into its normal position, when the pressure is removed, these pins will immediately engage in this row of perforations and temporarily secure the stamp strip 127 against any longitudinal shifting, which, as already mentioned is a condition for the proper engagement of the gripper pins 225.

To enable the pins 225 of the gripper arm 224 to pull forward the stamp strip 127 at the proper time, the pins 231 of the bail 229 must evidently first release the stamp strip. For this purpose an axle 233 is arranged above the upper guide plate 197 and carries a sheet metal strip 234 which bears with its front portion on a pin 235 fixed on a lateral right angularly bent extension 236 of the bail 229 and extending freely through the lower and upper guide plate 198 and 197. On the same side, that is the right side of the stamp guide 197, 198 a spring 237 is fixed on the guide plate 197, the rearwardly directed free end of this spring being bent up at an incline. This spring lies in the path of the free downwardly bent end of the gripper arm 224 (Fig. 16) in such a manner that, during the forward movement of the gripper arm, that is during its movement towards the left as shown in Figs. 16, 17, this end of the arm first slides along the upper surface of the spring 237 in order to be finally slightly lifted by the upwardly bent end of this spring against the pressure of the spring 223 acting on the rocker element 214 (Fig. 17). However, as soon as the front end of the gripper arm 224 has passed the upwardly bent end of the spring 237, the full pressure of the spring 223 acts on the rocker element 214, swing this together with the gripper arm 224 in downward direction, thereby overcoming the slight resistance offered by the pawl 222, and thus causes the end of the gripper arm 224 to bear with such pressure on the sheet metal flap 234 supported by the pin 235 (Figs. 37 to 39) that this flap is pressed downwards. This pressure is also transmitted to the bail 229 by the pin 235; consequently this bail swings downwards and pulls the pins 231 out of the row of perforations 226 in the stamp strip 127 in which they were previously engaged. During the downward movement of the gripper arm 224 its pins 225 now engage in the row of perforations and subsequently transport the stamp strip 127 a distance of one stamp length during the return movement of the carriage 214 and the gripper arm 224 into their inoperative positions (Figs. 16, 17). The free end of the gripper arm 224 is compelled by the upwardly bent end of the spring 237 (Fig. 39) to slide along the under side of this spring, and shortly before reaching its inoperative position slides on to and is again lifted by a short upwardly inclined surface 238 (Figs. 16, 34–36). At the same time the rocker element 214 overcoming the resistance of the pawl 222 also returns out of its downwardly swung position (Fig. 17a) into the position shown in Fig. 17, so that all parts of the carriage 214 are again in the inoperative position and consequently ready for the next operation.

The release of the stamp strip 127 is effected directly under the blade 239 of a severing device which is constructed in the following manner:—

A small vertical frame 240 (Figs. 34 to 36) is fixed on the under side of the angle piece 141 (Figs. 7, 9, 18), this frame having in its under edge a rectangular aperture 241. This aperture is closed at the bottom by a bar 242 fixed by screws on two lateral flanges of the frame 240 and lies exactly in alignment with the stamp guide 197, 198 (Figs. 28, 30, 32) and of the gripper arm 224 (Figs. 16, 17), which slides through the aperture 241 during its reciprocating movement. The blade 239 is vertically shiftable between lateral guide bars 243 of the frame on the rearwardly directed surface of the frame 240. A small U-shaped strap 245 is fixed by means of a screw 244 on the front surface of the blade 239. This strap 245 can move up and down in a vertical slot in the frame 240 and controls the blade 239. The strap 245 is controlled by a lever 246 (Figs. 9, 18), the free rounded end of which engages between the two horizontal arms of the strap 245 and is rigidly connected with a bell crank 247 by means of its hub. The lever 246 and bell crank 247 are jointly rotatable about a pin 248 in the right side part 95 of the frame and are acted upon by the pull of a spring 249. Under the action of this spring the lower arm of the bell crank 247 cooperates with a cam disc 250 fixed on the right side surface of the toothed wheel 150 in such a manner that the lever 246 during the operation, is pushed slowly and thus guides the strap 245 and the blade 239 (Figs. 34 to 36) out of their inoperative position into their upper extreme position (Fig. 36). The path of the blade 23 is liberated directly before the termination of each operation of the machine, that is at the moment at which the pins 225 (Figs. 16, 17) of the gripper arm 224 have again liberated the row of perforations 226 of the stamp strip 127 exactly below the blade 239 (Figs. 34 to 36) in that a small inclined surface 238 (Figs. 16, 34, 35) on a bent portion of the frame 240 slides on the bent end of the gripper arm. At this instance the lower arm of the bell crank lever 247 slides from the highest point of the cam 250 and thus causes the bell crank lever 247, the lever 246 and also the strap 245 with the blade 239 to precipitately drop into the inoperative position (Figs. 18, 36a) under the action of the relatively strong spring 249 (Fig. 18). The blade 239 thus severs along the row of perforations 226 the stamp pulled forward by the gripper arm 224 and resting with its rear edge on the bar 242. The end of the stamp strip 127 thus liberated and slightly pressed downwards by the blade edge bears against the oppositely bent and slightly enlarged lower ends 251 (Figs. 36, 36a) of a slide-like plate 252 which can also slide up and down between the guide bars 243 on the frame 240 and has a guide slot 253 through which the shank of the screw 244 extends. Owing to the arrangement of this elongated guide slot 253 the blade 239 and the plate 252 cooperate in such a manner that they do not immediately participate in the upward and downward movements of the blade but only in the second half thereof, and consequently move in retard of the movements of the blade. The result is that, during the downward movement of the blade 239, the frame ends 251 first participate in the supporting of the stamp strip 125 in the plane of the bar 242 but then yield slightly in downward direction and thus guide the liberated end of the stamp strips out of the path of the gripper arm pins 225. During the next operation the gripper arm 224 can thus slide freely towards the rear through the frame aperture 241 without its pins 225 upsetting the stamp strip 127. During the upward stroke of the blade 239, however, the frame ends 251 lift the free end of the stamp strip into the plane of the bar 242 shortly before the strip is again pulled forward by the gripper arm 224, so that the free end of the stamp strip can slide freely over the bar when being transported by the gripper arm 224 and come into the position necessary for severing the stamp pulled forward.

A second lever 254 (Figs. 9, 18) is rigidly connected with the lever 246 and is bent at right angles at its free end first horizontally and then vertically like a bayonet and has a forked presser foot 255. The lever 254 oscillates together with the lever 246 about the pin 248 and is connected with the lever 246 by a screw 256 which extends through a vertical slot in the lever 254. This arrangement enables the presser foot 255 to be adjusted in height as desired. The object of this presser foot is, to press the foremost stamp, severed by the blade 239, on to the pins 152 of the pressure drum 102 (Figs. 21, 22, 24) at the instant when the blade 239 (Figs. 34–36) precipitately slides downwards, the stamp being then held on the drum wall by these pins. The stamp now lies with its longitudinal axis in the direction of rotation of the pressure drum 102 at the moment when it is forced on to the pins 152, and, if it were to remain in this position, would be affixed standing sideways on the article to be stamped. As it is evident that this is not desirable, the stamp must before being affixed be turned through an angle of 90° and thus be brought the right way up relative to the package to be stamped. Moreover, the pins 152 must also be withdrawn from the stamp in order to liberate it for affixing. For these two purposes the pressure drum 102 is constructed in the following manner:—

An elongated U-shaped strap 258 is clamped between the two end walls 108 and 118 of the pressure drum 102, which walls are held together by three stay bolts 257. This strap 258 has in each of its two arms two bearing bores, the axes of which are radial to the axis of the pressure drum. Two discs 259, rigidly interconnected by a square 260, rotate one in each of these bores. The discs 259 and the square 260 are provided with a common longitudinal bore, in which a bolt 261 can shift radially to the pressure drum wall. On the outer end of this bolt 261 a small disc 262 is fixed which carries the four pins 152. These pins project through four corresponding holes provided in the bottom of hood 263, rigidly connected with the outer disc 259. On the inner side of the second disc 259 a toothed wheel 264 is fixed, which carries four teeth mutually displaced through an angle of 90°. When the rigid unit, formed by the discs 259, the square 260, the hood 265 and the toothed wheel 264, rotates in the bearing formed by the arms of the strap 258, the disc 262 with its pins 152 and also the stamp actually pressed thereon must participate in this rotation owing to the engagement of the pins 152 in the holes in the hood 263. The rotation of the parts in question is effected by the fact that, during each rotation of the pressure drum 102 and of the parts arranged thereon around the stationary axle 101, one of the four teeth of the toothed wheel 264 always engages a lug 265 of a collar 266 provided on the axle 101. The tooth in question is arrested and thus causes a part rotation of the toothed wheel 264 and of the part connected therewith including the disc 262 and its pins 152. To ensure that the part rotation is each time through an angle of 90° as is necessary for the desired turning of the stamp into the proper position, two blade springs 267 are fixed on the inner side of the bottom of the strap 258 and cooperate with the square 260 on opposite sides thereof in such a manner that the square must positively continue the part rotations imparted to it by the lug 265 and the toothed wheel 264 until it has turned through 90°. The blade springs 267 then bear on the two hitherto exposed flat faces of the square 260 and thus secure the unit formed by the parts 259, 260, 262, 152, 263, 264 in its new position.

The liberation of the stamp actually held, by the retraction of the pins 152 into alignment with the pressure drum wall is effected in the following manner:—

As already mentioned, the bolt 261 carrying the disc 262 with the pins 152 is axially shiftable in a bore in the discs 259 and the square 260. The disc 262 guided in the hood 263 also participates in this shifting movement with its pins 152. The inner end of the bolt 261 permanently bears against the circumference of the pressure drum axle 101 rigidly mounted in the gearing frame 94, 95. The under side of this axle is flattened in the plane of the bolt 261 in the manner illustrated in Fig. 21 and also on its rear side. As soon as the pins 152 carrying the stamp bear against the surface of the package to be stamped during the rotation of the pressure drum 102, these pins, as the inner end of the bolt 261, can engage the flattened portion 268 of the axle 101, yield into the four holes of the hood 263 so far, that their points finally lie in alignment with the wall surface of the pressure drum 102 and consequently liberate the stamp which is then affixed on the postal package by the pressure of the pressure drum if it has just previously been moistened on its back by the above described moistening device. The bolt 261, the disc 262 and the pins 152 then remain in retracted position until the pressure drum 102 has rotated through about three quarters of its entire circumference. The inner end of the bolt 261 then again runs on to the solid wall surface of the axle 101 and is thus again pressed outwardly so that the pins project from the wall of the pressure drum and are ready to receive the next stamp.

To prevent the stamp actually pierced from springing off the wall surface of the pressure drum 102 owing to the elasticity of the stamp, this drum is connected on its front portion by a bent guide plate 269 (Figs. 9, 15) on the lower edge of which two bent wires 270 are fixed, which also serve for pressing the stamp against the surface of the pressure drum 102, but nevertheless render it possible for the moistening roller 157 (Figs. 7, 13) to come in contact with the gummed back of the stamp. The moistening roller 157 provided on both sides of the pair of already mentioned annular grooves 163' has further annular grooves situated in the path of the wires 270 (Fig. 15), and in which grooves the wire in question lies exposed during the moistening of the stamp back without hindering the stroke and rotation of the moistening roller 157. At the end of the wires 270 the stamp finally comes into contact with the postal package to be stamped in order to be then affixed thereon.

During the affixing of the stamp it is defaced by a suitable impression (by horizontal lines in the example illustrated in Fig. 25), and immediately thereafter the date and name of the firm or the like are printed beside the stamp. All these printings are carried out by curved printing plates 271, 272, 273 (Fig. 21) of which the plate 271 has a circular aperture in the middle, which is filled by the bottom of the hood 263 and the pins 152 shiftable therein. The defacing printing consequently has a small gap in the middle as shown in Fig. 25. At the same time as the defacing of the stamp the control number of the machine, for example "371" is printed on the upper edge of the stamp and on the portion of the package directly adjacent thereto in such a manner that the number appears half on the package and half on the stamp. This prevents defaced stamps of high value from being detached from letters received and employed instead of the detached stamps of a lower value of a letter to be dispatched. The lacking sequence between the upper and lower half of the control number, which would then be composed of parts of two different control numbers will immediately indicate fraud in this instance to the supervising authorities.

The middle printing plate 272 has a central rectangular aperture into which the printing types of several number wheels 274 project which can print in known manner the actual date, for example "11.8.33" and for this purpose must be correspondingly adjusted every day. The number wheels 274 are freely rotatable on an axle 275 overcoming a certain resilient resistance, said axle being journalled in a U-shaped strap clamped between the printing drum walls 108, 118. The simultaneous printing of the printing plate 272 and the actually adjusted printing types of the number wheels 274 form the middle portion of the total impression shown in Fig. 25. The third printing plate 273 serves for printing the name of the firm or the like on the postal package.

The inking of the three printing plates 271, 272, 273 is effected at each operation of the machine after the delivery of the stamp for the next machine operation, namely by means of the inking device illustrated in Figs. 26, 27. This device comprises a hollow cylinder 277 with a sieve-like perforated wall and a covering of felt or the like, which cylinder is rotatably mounted in a bearing bracket 278. The cylinder is filled with ink through its left axle end (on the right in Fig. 27), which end is normally kept closed by a screw 279 and is provided with a small protecting cup 280, for catching any printing ink which may overflow during the filling. The bearing bracket 278 is rotatable about a small axle 281 which is journalled in an angular frame 282 provided with upwardly bent edges. This frame is fixed by means of its short vertical arms on the inner side of the right frame part 95 (Fig. 7) in such a manner that only the wall surface of the pressure drum 102 is permanently in contact with the inking cylinder 277. A pressure spring 283 acting against the lower rear edge of the bearing bracket 278 (Fig. 26) ensures that this contact takes place with the necessary pressure.

The actual adjustment of the step-by-step counter 143 (Fig. 7) and of the value adding mechanism 144 can be easily read by anyone through two windows 284, 285 provided in the cover wall of the machine casing 87.

In the cover 132 (Figs. 28, 30) of each stamp cap 125 a small trapezium-shaped window 286 is cut, which exposes the edge of the actually inserted stamp strip 127 and by means of a suitable graduation enables the approximate thickness of the actual stamp stock in a stamp cap. Nevertheless it may evidently happen by oversight that a fresh stamp strip is not placed in an empty stamp cap, and the empty drum is inserted in the machine. In this instance, if no special safety device were provided, the letter to be stamped would be provided with the impression shown in Fig. 25, the machine operation registered in the step-by-step counter and the actually delivered value recorded in the adding mechanism 144, without, however, a stamp being affixed. In order to avoid this, provision is made that, if an empty stamp cap is inserted into the machine, the step-by-step counter 143 and the adding mechanism 144 cannot operate. This is effected in the following manner:—As will be remembered, the drive both of the step-by-step counter 143 and also of the adding mechanism 144 is effected through the intermediary of the toothed segment disc 148 (Figs. 28, 33). If the rotation of this disc is prevented, the drive of the counting and adding mechanisms will not take place. A small pawl 287 is fixed on the above mentioned axle 227 (Figs. 37 to 40) which carries a plate 228 bent in goose-neck shape. This pawl lies within the box-shaped cap extension 126 and can cooperate with a notch 288 in the hub 289 of the double toothed wheel 147, 148. If a stamp strip 127 lies in the guide 197, 198, the bent end of the plate 228 bears gainst the under surface of the stamp actually foremost. The pawl 287 liberates the hub 289 of the double toothed wheel 147, 148 so that this can rotate. If, however, the stamp guide 197, 198 is empty, the plate 228 swings upwards under the action of its loading spring through the apertures in the two guide plates 197, 198 and thus causes the pawl 287, hitherto in the inoperative position (Fig. 40) to move into the locking position shown in dot-dash lines. The pawl 287 consequently engages in the notch 288 of the hub 289 and thus prevents the rotation of the double toothed wheel 147, 148 necessary for driving the step-by-step counter 143 and the value adding mechanism 144.

If desired, each stamp cap 125 may also be provided with a value adding mechanism or step-by-step counter which is directly or indirectly driven by the toothed segment disc 148 or the toothed wheel 147 (Figs. 28, 30, 33) and indicates the actual consumption of stamps of the value in question.

The machine is operated in the following manner:—

It must first be seen that the water container 154 of the moistening device 157 (Figs. 7, 9, 13, 14) is filled with water and the inking cylinder 277 (Figs. 7, 26, 27) of the inking device with printing ink. This can be effected by removing the inserted door 88 (Fig. 8) closing the front of the casing 87, pulling the moistening device 154, 157 out of the guides 153 (Figs. 7, 9, 10), opening the closing screw 174, filling the water container 154 and again screwing in the closing screw 174. The moistening device is then again inserted in the machine and the inserted door 88 closed. For charging the inking cylinder 277 (Figs. 7, 26, 27) it is first necessary to remove the left side wall of the machine casing 87. Then place the machine on its right side, unscrew the closing screw 279 (Figs. 7, 26, 27), fill the inking cylinder 277, again screw in the closing screw 279 and close the casing 87 by re-fixing the left side wall by means of screws. After inserting a stamp cap properly filled with a stamp strip 127 (Fig. 41) the machine is ready for use.

In order to insert a fresh rolled stamp strip into an empty stamp cap 125 (Figs. 28 to 33) first take off the cover 132, if necessary tearing a safety paper sealing strip 199, and then remove the knob 204 in the manner already described. Hereupon expose the slit 194 of the drum 181 by turning the clamping device 195 in anti-clockwise direction (Fig. 32), slip the rolled stamp strip into the drum, and insert the inner end of the strip into the slit 194, where it is tightly clamped by turning the clamping device 195 in the opposite direction. The outer end of the stamp strip is passed with its picture side downwards, through the slit 196 (Fig. 32) in the stamp cap 125 into the stamp guide 197, 198, from which the sleeve 200 has been previously removed. The end of the stamp strip is then pulled into the stamp guide thus exposed, so that the pins 231 of the strap 229 (Figs. 37–39) engage in the row of perforations 226 of the stamp strip. Hereupon place a paper strip 199 (Fig. 28) on the left side wall of the stamp guide 197, 198, push the sleeve 200 thereover, put on the cap cover 132, slip the perforated right end of the paper strip 199 over the upper end of the axle 175, and finally secure the stamp cap 125 thus closed against unauthorized opening by slipping the knob 204 on to the axle 175.

If the filled stamp cap is now placed into the machine from the rear, the nose of the lever 135 is brought into the aperture 122 (Fig. 19) of the ring 121 by swinging out the lever 133, 134 (Fig. 18), the toothed wheel 147 (Fig. 28) being at the same time coupled with the toothed wheel 151 (Figs. 7, 18). The two pawls 184, 189 are also swung by the abutment 188 (Fig. 33) in such a manner that both the ratchet wheel 178 and also the double toothed wheel 147, 148 are free to rotate. The machine is then ready for use.

In order to use the machine, place the thumb of the right hand in the curved plate 91 (Fig. 8) and the finger tips of the middle, third and little finger under the gripper bar 92. By exerting pressure with the index finger on the knob 93 the machine is unlocked in the manner above described and can be pushed along a flat surface. During this movement the pressure drum 102 (Figs. 7, 15, 19) performs a complete rotation and thus causes, by means of the cam groove 217, the already mentioned operation of the set of levers 211, 210, 208, 209 and consequently the reciprocation of the carriage 214. The gripper arm 224 carried by the carriage grips the stamp strip 127 in the manner explained and pulls it forward the length of one stamp, so that the first row of perforations 226 lies exactly under the severing device 239, 240 (Figs. 34 to 36). As soon as the gripper arm 224 (Figs. 16, 17) has again liberated the row of perforations 226 and returned into its inoperative position, the blade 239 (Figs. 34 to 36) descends precipitately by the cooperation of the elbow lever 247 (Fig. 18) with the cam disc 250 and severs the foremost stamp from the strip. This is immediately pressed by the presser foot 255 on to the pins 152 (Figs. 21, 22, 24) of the pressure drum 102 which pins at this moment have just attained the top side of the drum. During the following last quarter of the pressure drum rotation all the parts return into their inoperative positions, the severed stamp being already held directly above the moistening device 157 (Figs. 7, 13) in order, at the next operation of the machine, to be affixed on the package to be stamped and to be defaced. The delivering of a stamp does not take place during the preparatory machine operation above described, but is recorded in the step-by-step counter 143, and the value of the stamp is added in the value adding mechanism 144. The three printing plates 271, 272, 273 (Fig. 21) of the pressure drum 102 have already been properly provided with printing ink by the inking cylinder 277 (Figs. 26, 27). At the termination of the operation the machine is automatically locked.

During the next and each following machine operation, which must be prepared every time by depressing the knob 93 (Figs. 7, 8), exactly the same movements take place in the machine. At the same time, however, namely immediately before the commencement of the operation, the gummed back of the stamp already held is guided along the moistening roller 157 (Figs. 9, 13, 14) and thus moistened. As the drum continues to rotate, the moistened stamp is guided completely downwards, liberated by the retracted pins 152 (Figs. 21, 22, 24), affixed by the wall of the pressure drum 102 on the postal package to be franked and at the same time defaced and provided with the control impression by the printing plate 271 (Fig. 21). During the further rotations of the pressure drum 102 the dispatch stamp is printed by the printing plate 272 on the left beside the affixed stamp (Fig. 25) and the name of the firm or the like by the printing plate 273. All these procedures are repeated at every machine operation.

If it is desired to affix stamps of another value, open the rear hinged door 89 (Fig. 8), pull out the stamp cap 125 hitherto used and insert in its stead another stamp cap filled with stamps of the other value coming into question, after which the machine is again operated in the same manner as before. If no stamp cap is inserted in the machine, the stamp last severed and held in readiness for use is delivered but without recording its value, which was already effected in the preceding operation of the machine, and evidently also without preparing a fresh stamp. At every use of the machine without a stamp cap only the printing of the three stamps shown in Fig. 25 takes place without at the same time delivering a stamp and without recording of any kind. Such idle operations are carried out for instance to make sure that the date printing wheels 274 (Fig. 21) are properly adjusted and that the printing plates 271–273 give sharp impressions.

When the last stamp is delivered from a stamp cap or when an empty stamp cap is inserted, the drive of the machine as already explained is automatically stopped by the pawl 287 (Fig. 40).

I claim:—

1. An apparatus for delivering and affixing labels, comprising in combination a storage reel for a label strip, arrangements for pulling a label off said storage reel, arrangements for severing this label from said strip, arrangements for moistening this label, arrangements for affixing this label on a support, a stationary axis in said apparatus, and a driving means adapted to be rotated about said axis by the apparatus being pushed over the support and to control the arrangements for pulling off, severing, moistening and affixing.

2. An apparatus for delivering and affixing labels, comprising in combination an exchangeable storage reel and casing for a label strip, a gearing connected with said casing, a value adding mechanism adapted to be controlled by said gearing, an arrangement for pulling a label off said reel, an arrangement for severing this label from the strip, an arrangement for moistening this label, an arrangement for affixing this label on a support, and a driving means adapted to be rotated by the apparatus being shifted over the support and to control the arrangement for pulling off a label, the gearing for the storage reel and the arrangements for severing, moistening and affixing the label.

3. An apparatus for delivering and affixing labels, comprising in combination an exchangeable storage reel and casing for labels, a gearing connected with said casing, a value adding mechanism adapted to be controlled by said gearing, a label counter, an arrangement for pulling a label off said storage reel, an arrangement for severing this label from the strip, an arrangement for moistening this label, an arrangement for affixing this label on a support, and a driving means adapted to be rotated by the apparatus being shifted over a support and to control the arrangement for pulling off the label, the gearing for the storage reel, the label counter and the arrangements for severing, moistening and affixing the label.

4. An apparatus for delivering and affixing labels, comprising in combination a storage reel for a label strip, an arrangement for pulling a label off said reel, an arrangement for severing this label from the strip, an arrangement for moistening this label, an arrangement for affixing this label on a support, an arrangement for applying a distinctive mark on said label, a stationary axis in said apparatus, and a driving means adapted to be rotated about said axis by the apparatus being shifted over the support and to control the arrangements for pulling off, severing, moistening, affixing and marking the label.

5. An apparatus for delivering and affixing labels, stamps and the like, comprising in combination a storage reel for labels in a strip, arrangements for pulling a label off said reel, arrangements for severing this label from the strip, arrangements for moistening this label, arrangements for affixing this label on a support, arrangements for applying a distinctive mark on said label, arrangements for applying a distinctive mark on the support, a stationary axis in the apparatus, and a driving means adapted to be rotated about said axis by the apparatus being shifted over a support and to control the arrangements for pulling a label off the storage reel, severing, moistening, affixing this label on the support and marking this label and the support.

6. An apparatus for delivering and affixing labels, comprising in combination an exchangeable storage reel and casing for labels in a strip, a gearing connected with said casing, an adding mechanism adapted to be controlled by said gearing, an arrangement for pulling a label off said reel, an arrangement for severing this label from the strip, an arrangement for moistening this label, an arrangement for affixing this label on a support, an arrangement for applying a mark on this label, and driving means adapted to be rotated by the apparatus being shifted over a support and to drive the arrangements for pulling off the label, the gearing for the storage reel and the arrangements for severing a label from the strip, moistening, affixing and marking this label.

7. An apparatus for delivering and affixing labels, comprising in combination an exchangeable storage reel and casing for labels in the form of a strip, a gearing connected with said casing, a value adding mechanism adapted to be controlled by said gearing, a label counter, an arrangement for pulling a label off said storage reel, an arrangement for severing this label from the strip, an arrangement for moistening this label, an arrangement for affixing this label on a support, an arrangement for applying a distinctive mark on this label, an arrangement for applying a distinctive mark on the support, and a driving means adapted to be rotated by the apparatus being shifted over a support and to actuate the apparatus for pulling off a label, the gearing for the storage reel, the label counter and the arrangements for severing this label from the strip, for moistening and affixing this label and the arrangements for applying a distinctive mark on this label and on the support.

8. An apparatus for delivering and affixing labels, comprising in combination a storage reel for labels in the form of a strip, an arrangement for pulling a label off said storage reel, an arrangement for severing this label from the strip, an arrangement for moistening this label, an arrangement for affixing this label on a support, a stationary axis in said apparatus, and a drum-shaped driving device adapted to be rotated about said axis by the apparatus being shifted over the support and to drive the arrangements for pulling off, severing and moistening, and during its rotation to transport a severed label to the moistening arrangement and deliver it to the support and press it thereon.

9. An apparatus for delivering and affixing labels, comprising in combination a storage reel for labels in the form of a strip, arrangements for pulling a label off said reel, arrangements for severing this label from the strip, arrangements for moistening this label, a driving means adapted to be rotated by the apparatus being shifted over a support, this driving means constructed as a drum and equipped with pins for holding the severed label on said drum, said driving means also adapted during its rotation to control the arrangements for pulling off, severing and moistening to transport a severed label, feed it to the moistening device and affix it on the support.

10. An apparatus for delivering and affixing labels, comprising in combination a storage reel for labels in the form of a strip, arrangements for pulling a label off said reel, arrangements for severing this label from the strip, arrangements for moistening this label, a drum-shaped driving means and a locking device for said driving means, said locking device controlled by said driving means, hand actuated means for disengaging said locking means, pins on said driving means adapted to hold a label on said driving means, said driving means adapted during its rotation to drive the means for pulling off, severing and moistening the label, for transporting the severed label, feeding it to the moistening arrangement and affixing it on the support.

11. An apparatus for delivering and affixing labels, comprising in combination a storage reel for labels in the form of a strip, arrangements for pulling a label off said reel, arrangements for severing this label from the strip, arrangements for moistening this label, a drum-shaped driving means adapted to be rotated by the apparatus being shifted over a support, a locking device for said driving means controlled by said driving means, hand actuated means for disengaging said locking device, pins on said drum-shaped driving means adapted to hold the severed label on said means, said driving means adapted during its rotation to simultaneously control the arrangements for pulling off and severing a label on the one hand and the arrangements for moistening the severed label on the other hand so that one label is pulled off the reel and severed from the strip while an already severed label is transported by the driving means, fed to the moistening arrangement and affixed on the support.

12. An apparatus for delivering and affixing lebels, comprising in combination a storage reel for labels in the form of a strip, arrangements for pulling a label off said reel, arrangements for severing this label from the strip, arrangements for moistening this severed label, a drum-shaped driving means adapted to be rotated by the apparatus being shifted over the support, a locking device for said driving means controlled by said driving means, hand actuated means adapted to disengage said locking device, pins on said driving means adapted to hold a severed label on said driving means, said driving means adapted to transport a severed label, feed it to the moistening device and affix it on the support, and also adapted during its rotation to control the arrangements for pulling off, severing and moistening a label and the locking device so that said locking device is prevented from rotating immediately after the severance of a label.

13. An apparatus for delivering and affixing labels, stamps and the like, comprising in combination a storage reel for labels in the form of a strip, arrangements for pulling a label off said reel, arrangements for severing this label from the strip, arrangements for moistening this label, arrangements for affixing this label on a support, a label counter, a stationary axis in the apparatus, a drum-shaped driving means rotatable about said axis, said driving means adapted to be rotated by the apparatus being shifted over the support and to drive the devices for pulling off, severing, moistening and affixing a label and the label counter.

14. An apparatus for delivering and affixing labels, stamps and the like, comprising in combination a driving means adapted to be rotated by the apparatus being shifted over a support, an exchangeable storage reel and casing for labels in the form of a strip, a gearing connected with said casing and having a plurality of feed teeth corresponding in number to the number of individual values of the labels on said storage reel, a value adding mechanism adapted to be driven by said driving means through the intermediary of said gearing, an arrangement for pulling a label off said reel, an arrangement for severing this label from the strip, an arrangement for moistening this label, and an arrangement for affixing this label on a support, said arrangements for pulling off, severing, moistening and affixing a label controlled by said driving means.

15. An apparatus for delivering and affixing labels, stamps and the like, comprising in combination a driving means adapted to be rotated by the apparatus being shifted over a support, an exchangeable storage reel for labels in the form of a strip, means for coupling said reel with said driving means, locking means for preventing a forward and backward movement of said reel, means for influencing said locking means for liberating said reel when coupled with said driving means, an arrangement for pulling a label from said storage reel, an arrangement for severing this label from the strip, an arrangement for moistening this label, and an arrangement for affixing this label on a support, all these arrangements for pulling off, severing, moistening and affixing a label driven by said driving means.

16. An apparatus for delivering and affixing labels, stamps and the like, comprising in combination a driving means adapted to be rotated by the apparatus being shifted over a support, an exchangeable storage reel and casing for labels in the form of a strip, a gearing connected with said casing, means for coupling said storage reel with said driving means, a value adding mechanism, means for coupling said gearing of the storage reel with said value adding mechanism, a locking device adapted to block the movement of said storage reel and said gearing, means for disengaging said locking device during the coupling of said storage reel with said driving means, and of said gearing with said value adding mechanism, an arrangement for pulling a label off said reel, an arrangement for severing this label from the strip, an arrangement for moistening this severed label, an arrangement for affixing this moistened label on the support, all of said arrangements for pulling off, severing, moistening and affixing the label controlled by said driving means.

17. An apparatus for delivering and affixing labels, comprising in combination, a stationary axis in said apparatus, a driving means adapted to be rotated about said axis by the apparatus being shifted on a support, a storage reel for labels in the form of a strip, an arrangement for pulling a label off said storage reel, an arrangement for severing this label from the strip, an arrangement for moistening this label, an arrangement for affixing this label on the support, an arrangement for applying a distinctive mark on the label before affixing on the support, said driving means adapted to control all these arrangements for pulling off, severing, moistening and affixing the label and for applying a distinctive mark thereon.

18. An apparatus for delivering and affixing labels, comprising in combination a storage reel for labels in the form of a strip, a casing enclosing said reel, arrangements for pulling a label off said storage reel, a guide for this label, arrangements for severing this label from the strip, arrangements for moistening this label, arrangements for affixing this label on a support, a stationary axis in said apparatus, and a driving means adapted to be rotated about said axis by the apparatus being shifted over the support and to control the arrangements for pulling off, severing, moistening and affixing the label.

19. An apparatus for delivering and affixing labels, comprising in combination a storage reel for labels in the form of a strip, arrangements for pulling a label off said reel, arrangement for severing this label from the strip, arrangements for moistening the severed label, a drum-shaped driving means, a locking device for said driving means adapted to be actuated by hand to liberate said driving means for rotation and to be actuated by said driving means to lock said driving means against rotation, pins in said driving means adapted to influence said locking device, said driving means adapted to be rotated by the apparatus being shifted over the support and to thereby control the arrangements for pulling off, severing and moistening a label, the locking device and the arrangement for affixing the moistened label.

20. An apparatus for delivering and affixing labels, stamps and the like, comprising in combination a storage reel for labels in the form of a strip, an exchangeable casing for accommodating said storage reel, a gearing connected with said casing, arrangements for pulling a label off said storage reel, arrangements for severing this label from the strip, arrangements for moistening this label, arrangements for affixing this label on a support, a value adding mechanism adapted to be actuated by the gearing of said casing, a drum-shaped driving means adapted to be rotated by the apparatus being shifted on the support, means for coupling said driving means with the gearing of said casing, and guiding means for said casing to ensure the coupling between said gearing and said driving means.

21. An apparatus for delivering and affixing labels, stamps and the like, comprising in combination a driving device adapted to be rotated by the apparatus being shifted on a support, a storage reel for labels in the form of a strip, an exchangeable casing adapted to accommodate said reel, means for coupling said casing with said driving means, locking devices on said casing adapted to prevent a movement of said storage reel, means for influencing said locking devices to liberate said storage reel during the coupling of said casing with said driving means, an arrangement for pulling a label from said storage reel, an arrangement for severing this label from the strip, said arrangements for pulling off and severing the label actuated by said driving means.

22. An apparatus for delivering and affixing labels, stamps and the like, comprising in combination a storage reel for labels in the form of a strip, an exchangeable casing for accommodating said storage reel, a gearing connected with said casing, a driving means adapted to be rotated by the apparatus being shifted on a support, means for coupling said driving means with said gearing, locking devices adapted to allow the coupling and decoupling of said gearing with said driving means only when said driving means is in a predetermined position, said locking devices controlled by said driving means.

23. An apparatus for delivering and affixing labels, stamps and the like, comprising in combination a storage reel for labels in the form of a strip, an exchangeable casing for accommodating said reel, a gearing connected with said casing, a drum-shaped driving means adapted to be rotated by the apparatus being shifted on a support, a guide for said casing, a disc on the end of said driving means and provided with an annular bead having a slot, and a projection on said casing adapted to engage in said slot when said driving means is in a predetermined position.

24. An apparatus for delivering and affixing labels, stamps and the like, comprising in combination a driving means adapted to be rotated by the apparatus being shifted on a support, a locking device for said driving device comprising a rod adapted to be shifted by hand and an intermediate element controlled by said driving means, said rod adapted in its position of rest to lock said intermediate element so that said intermediate element locks said driving device against movement, arrangements adapted after the rod has been shifted by hand to maintain said rod in operative position liberating said intermediate element, said arrangements controlled by said driving means to bring said rod into its inoperative position.

25. An apparatus for delivering and affixing labels, stamps and the like, comprising in combination a driving means adapted to be rotated by the apparatus being shifted over a support and a locking device for said driving device, said locking device consisting of a rod adapted to be shifted by hand, a spring acting on said rod and tending to bring said rod into its inoperative position, an intermediate element adapted to act on said driving means, said rod adapted when in its inoperative position to lock said intermediate element to lock said driving means, holding discs adapted to hold said rod in operative position against the action of said spring to liberate said intermediate element, and means for disengaging said holding means controlled by said driving means.

26. An apparatus for delivering and affixing labels, stamps and the like, comprising in combination a storage reel for labels in the form of a strip, a driving means adapted to be rotated by the apparatus being shifted over the support and a locking device for this driving means, said locking device consisting of a rod adapted to be shifted by hand, an intermediate element, a spring acting on said intermediate element, a bell crank lever, a pin fixed on said driving means, said bell crank lever adapted to transmit the movement of the pin of said driving means to said intermediate element, and said rod adapted to prevent the movement of said intermediate element.

27. An apparatus for delivering and affixing labels, stamps and the like, comprising in combination a storage reel for labels in the form of a strip, an exchangeable casing accommodating said storage reel, a driving means adapted to be rotated by the apparatus being shifted over a support, a locking device adapted to lock said driving means, means for coupling said casing with said driving means, a guide for said casing, means on said guide for preventing the insertion of the casing into the apparatus and adapted to be disengaged by said casing only when said driving means is in its locked inoperative position.

28. An apparatus for delivering and affixing labels, stamps and the like, comprising in combination a storage reel for labels, an exchangeable casing for accommodating said storage reel, a driving means adapted to be rotated by the apparatus being shifted on a support, a locking device for locking said driving means, means for coupling said casing with said driving device, a guide for said casing, locking means adapted to maintain said casing in the apparatus after said driving means has been set in motion.

29. An apparatus for delivering and affixing labels, stamps and the like, comprising in combination a storage reel for labels, an exchangeable casing for accommodating said storage reel, a driving means adapted to be rotated by the apparatus being shifted on a support, a locking device adapted to lock said driving device in an inoperative position, means for coupling said casing with said driving means, a guide for said casing, means for preventing the introduction of said casing in the apparatus, said means arranged on the guide for the casing and adapted to be disengaged by said casing when said driving means is in its locked inoperative position, means for holding the inserted casing after the operation of said driving means, said holding means being rendered operative by the disengagement of the means for preventing the introduction of the casing and in this position influenced by said driving means.

30. An apparatus for delivering and affixing labels, stamps and the like, comprising in combination a storage reel for labels, an exchangeable casing for accommodating said storage reel, a drum-shaped driving means adapted to be rotated by the apparatus being shifted on a support, a locking device adapted to lock said driving means in an inoperative position, lateral discs on said driving means, an annular bead provided on said discs and having a slot, a guide for said casing, means for coupling said casing with said driving means, an oscillatable lever adapted to be oscillated by the insertion of said casing, a locking lever adapted to lock the inserted casing and controlled by said oscillatable lever, a nose on said locking lever adapted when the driving means is in inoperative position to engage the slot in said annular bead and, when the driving means is operative, to be held in locking position by said bead.

31. An apparatus for delivering and affixing labels, stamps and the like, comprising in combination a storage reel for labels, an exchangeable casing for accommodating said storage reel, a gearing connected with said casing, a driving means adapted to be rotated by the apparatus being shifted on a support, means for coupling said gearing with said driving means, and a label counter adapted to be actuated by said gearing while said casing is coupled with said driving means.

32. An apparatus for affixing labels, stamps and the like, comprising in combination a storage reel for labels, a drum-shaped driving means adapted to be rotated by the apparatus being shifted over a support, a cam wheel connected with said driving means, an arrangement for feeding a label, said arrangement controlled by said driving means, a device for moistening this label oscillatably mounted on the apparatus and adapted to be controlled by said cam wheel.

33. An apparatus for delivering and affixing labels, stamps and the like, comprising in combination a storage reel for labels, an exchangeable casing accommodating said storage reel, a driving means adapted to be rotated by the apparatus being shifted on a support, a locking device adapted to lock said driving means in inoperative position, hand operated devices adapted to liberate said driving means, an arrangement for feeding a label from said reel controlled by said driving means during its rotation, an arrangement also actuated by said driving means and adapted to moisten the label during its feeding movement, said last mentioned arrangement composed of a water container and a hollow perforated moistening roller connected with said container, a valve on said container adapted to admit air into said water container and actuated by said hand operated device for liberating said driving means.

34. An apparatus for delivering labels, stamps and the like, comprising a drum-shaped driving device adapted to be rotated by the apparatus being shifted on a support, a storage reel for labels in the form of a strip, an exchangeable casing accommodating said reel, a ratchet wheel on said casing, a pawl engaging said ratchet wheel, and a spring acting on said pawl and tending to maintain the same in engagement with said ratchet wheel, said ratchet wheel coupled with said reel.

35. An apparatus for delivering labels, stamps and the like, comprising in combination a storage reel for labels in the form of a strip, an exchangeable casing for said storage reel and provided with an aperture, a ratchet wheel on said casing and coupled with said reel, a pawl, a spring acting on said pawl and tending to maintain the same in engagement with said ratchet wheel, a driving device adapted to be rotated by the apparatus being shifted on a support, devices for pulling a label off said reel, an abutment adapted during the introduction of said casing into the apparatus to pass through the aperture in said casing and shift said pawl against the action of said spring to liberate said ratchet wheel.

36. An apparatus for delivering labels, stamps and the like, comprising in combination a storage reel for labels in the form of a strip, an exchangeable casing accommodating said reel, a ratchet wheel on said casing coupled with said storage reel, and an oscillatable pawl provided with two locking noses, a spring acting on said pawl and tending to pull the same so that one of said noses engages said ratchet wheel, the other of said noses adapted to engage in said ratchet wheel when said pawl is oscillated, and a device adapted during the insertion of said casing into the apparatus to oscillate said pawl so that neither of said noses are in engagement with said ratchet wheel.

37. An apparatus for delivering labels, stamps and the like, comprising in combination a driving device adapted to be rotated by the apparatus being shifted on a support, a storage reel for labels in the form of a strip, a casing for said reel, a gearing on said casing connected with said reel and adapted to be driven by said driving means, a ratchet wheel on said casing connected with said reel, a pawl, a spring acting on said pawl, said pawl provided with a plurality of noses, one of said noses adapted to engage said ratchet wheel under the action of said spring, and another of said noses adapted to engage said ratchet wheel when said pawl is moved against the action of said spring.

38. An apparatus for delivering labels, stamps and the like, comprising in combination a storage reel, an exchangeable casing for said reel consisting of a cup-shaped container, a cover closing said container and having an aperture, and a box-shaped extension adapted to be removed only after the removal of said cover from said container, an axle for said reel in said cup-shaped container, a knob on said axle of smaller diameter than the aperture in said cover, resilient means for holding said knob on said axle, and a destructible sealing strip adapted to close the aperture in said cover and to be held on the axle after the fitting of said knob.

39. An apparatus for delivering labels, stamps and the like provided with perforations, comprising in combination a casing, a storage reel for labels in the form of a strip accommodated in said casing, a label guide on said casing and pins mounted on a resilient member and movably arranged on said guide and adapted to engage the perforations between the foremost stamp and the next following portion of the strip.

40. An apparatus for delivering labels, stamps and the like provided with perforations, comprising in combination an exchangeable casing, a storage reel for labels in the form of a strip, a guide on said casing for the labels pulled off said reel, pins adapted to engage the perforations between the foremost label and the next following label, a movable carrying device for said pins mounted on said guide, a spring acting on said carrying device, and a casing covering said guide and said carrying device.

41. An apparatus for delivering labels, stamps and the like, comprising in combination a storage reel for labels in the form of a strip, an exchangeable casing accommodating said reel, a guide on said casing for the strip pulled out of said casing, a driving device adapted to be rotated by the apparatus being shifted on a support, a reciprocatable gripper controlled by the rotation of said driving means and adapted to pull a label out of the guide connected with the casing.

42. An apparatus for delivering labels, stamps and the like provided with perforations, comprising in combination a storage reel for labels in the form of a strip, a casing accommodating said reel, a guide for a label pulled out of said casing, a driving means adapted to be rotated by the shifting of the apparatus on a support, a reciprocated gripper controlled by said driving means, and pins on said gripper adapted to engage in the perforations between the foremost and next following labels.

43. An apparatus for delivering labels, stamps and the like, comprising in combination a storage reel, an exchangeable casing for said reel, a guide on said casing for the label pulled off the storage reel, a driving means adapted to be rotated by the apparatus being shifted on a support, a reciprocatable gripper adapted to pull a label out of the guide connected with the casing, means for controlling the movement of said gripper, said means coupled with said driving means and constructed so that the backward and forward movements of said grippers take place in different planes.

44. An apparatus for delivering labels, stamps and the like, comprising in combination a storage reel for labels in the form of a strip, an exchangeable casing for said reel, a guide on said casing adapted to accommodate the labels pulled off said reel, a driving means adapted to be rotated by the apparatus being shifted on a support, a reciprocable gripper controlled by said driving means during its rotation and adapted to pick the label out of the guide connected with the casing, a slide bar on said guide adapted to move away from the strip during the forward movement of the gripper and to approach the label at the end of the gripper movement.

45. An apparatus for delivering labels, stamps and the like provided with perforations, comprising in combination a storage reel for labels in the form of a strip, an exchangeable casing for said reel, a guide on said casing adapted to accommodate a label pulled off said reel, resiliently mounted pins on said guide adapted to engage in the perforations between the foremost and next following labels, means for lifting said pins out of the perforations, a driving means adapted to be rotated by the apparatus being moved on a support, a reciprocable gripper actuated by said driving means, pins on said gripper adapted to engage in the perforations between the foremost and next following labels, the means for disengaging the resiliently mounted pins of the guide from the perforations in the label strip being actuated by said gripper between its outward and return movements.

46. An apparatus for delivering labels, stamps and the like provided with perforations, comprising in combination a storage reel for labels in the form of a strip, an exchangeable casing for said reel, a guide on said casing adapted to accommodate the label pulled off said reel, a driving means adapted to be rotated by the apparatus being shifted on a support, a reciprocable gripper adapted to pull the label out of said guide connected with said casing, said gripper controlled by said driving means, a slide bar connected with said guide and adapted to hold said gripper out of contact with the label during its outward movement and to allow it to contact with the label at the end of its outward movement, and a fixed bar adapted to move said gripper away from the pulled forward label at the end of its return movement.

47. An apparatus for delivering labels, stamps and the like, comprising in combination a casing, a storage reel for labels in the form of a strip accommodated in said casing, a guide on said casing adapted to accommodate a label pulled off said reel, a driving means adapted to be rotated by the apparatus being moved over a support, a reciprocable gripper adapted to pull the label out of the guide connected with the casing, a cam disc in said driving means, and reversing levers cooperating with said cam disc to impart the reciprocating movement to said gripper.

48. An apparatus for delivering labels, stamps and the like, comprising in combination a storage reel for labels in the form of a strip, a casing accommodating said reel, a guide on said casing adapted to accommodate a label pulled off said reel, a feeler lever arranged in said guide and adapted to bear against the label in said guide, a bearing connected with said casing, means for locking said gearing arranged on said feeler lever, a driving means adapted to be rotated by the apparatus being moved on a support, and means for coupling said driving means with said gearing.

49. An apparatus for delivering labels, stamps and the like provided with perforations, comprising in combination a storage reel for labels in the form of a strip, a casing for said reel, a guide on said casing adapted to accommodate a label pulled off said reel, resilient pins arranged on said guide and adapted to engage the perforations between the foremost and next following labels, a resilient feeler lever arranged on said guide and adapted to bear against the label in said guide, a gearing connected with said casing, means for locking said gearing and controlled by said feeler lever, said feeler lever adapted to disengage said resilient pins from the perforations of the labe..

50. An apparatus for delivering labels, stamps and the like, comprising in combination a storage reel, an exchangeable casing for said reel, a counting mechanism on said casing, a gearing for controlling said counting mechanism, a driving means adapted to be rotated by the apparatus being shifted on a support, and means for coupling said driving means with said gearing.

51. An apparatus for delivering labels, stamps and the like, comprising in combination a casing, a storage reel in said casing, a gearing in said casing, a counting mechanism actuated by said gearing, arrangements adapted to lock said gearing and controlled by said counting mechanism, a driving means adapted to be rotated by the apparatus being shifted on a support, and means for coupling said driving means with said gearing.

52. An apparatus for delivering labels, stamps and the like, comprising in combination a driving means adapted to be rotated by the apparatus being moved over a support, a storage reel for labels connected to form a strip, a device for pulling said strip off said reel controlled by driving means, a knife adapted to sever a label from the strip, a spring acting on said knife, a cam in said driving means adapted to actuate said knife against the action of said spring.

53. An apparatus for delivering labels, stamps and the like, comprising in combination a driving means adapted to be rotated by the apparatus being moved over a support, a storage reel for labels connected in the form of a strip, a device for pulling a label off said reel, a knife adapted to sever this label, a spring acting on said knife, two windows one stationary and the other movable, both windows having an aperture for the passage of the label said knife arranged between the stationary window and the movable window, a cam in said driving means adapted to control said knife against the action of said spring.

54. An apparatus for delivering labels, stamps and the like, comprising in combination a driving means adapted to be rotated by the apparatus being moved over a support, a storage reel for labels connected in the form of a strip, an arrangement for pulling said strip off said reel, said arrangement controlled by said driving means, a knife adapted to sever a label from said strip, a spring acting on said knife, a stationary window, a movable window, both of said windows, having an aperture for the passage of the label, said knife arranged between said windows, a cam in said driving means adapted to operate said knife against the action of said spring, means on said knife adapted to influence said movable window, to cause said movable window to follow the movement of said knife.

55. An apparatus for delivering labels, stamps and the like, comprising in combination a driving means adapted to be rotated by the apparatus being moved on a support, a storage reel for labels connected in the form of a strip, a device for pulling the strip off said reel and controlled by said driving means, a movable knife adapted to sever a label from the strip, a stationary window having an aperture for the passage of the label strip, said knife arranged between the stationary window and the movable window, said movable window having a slot, a bolt on said knife engaging in said slot, a spring acting on said knife, and a cam in said driving means adapted to operate said knife against the action of said spring.

56. An apparatus for delivering labels, stamps and the like, comprising in combination a driving means adapted to be rotated by the apparatus being moved on a support, a storage reel for labels connected in the form of a strip and separated by perforations, a reciprocable gripper adapted to pull the strip off said reel, and to engage in the perforations between two adjacent labels, said gripper actuated by said driving means, a stationary window, a movable window, both of said windows provided with an aperture for the passage of the label strip, a movable knife arranged between said stationary window and said movable window, a spring acting on said knife, a guide element on said movable window adapted to lift said gripper out of the perforations of the strip, means on said knife adapted to influence said movable window to cause same to follow the movement of said knife, a cam on said driving means adapted to operate said knife against the action of said spring.

57. An apparatus for delivering labels, stamps and the like, comprising in combination a drum-shaped driving means adapted to be rotated by the apparatus being moved on a support, a storage reel for labels connected to form a strip, a device adapted to pull said strip off said reel and controlled by said driving means, a knife adapted to sever a label from said strip, a spring acting on said knife, a control lever for said knife, a cam on said driving means adapted to actuate said control lever, pins on said driving means adapted to hold a label on said driving means, means connected with said control lever adapted to press a severed label on to said drum-shaped driving means.

58. An apparatus for delivering and affixing labels, stamps and the like, comprising in combination a drum-shaped driving means adapted to be rotated by the apparatus being moved on a support, a storage reel for labels connected to form a strip, an arrangement for pulling a label off said reel, an arrangement for severing this label from the strip, an arrangement for moistening this label, these arrangements for pulling off, severing and moistening a label controlled by said driving means, pins on said driving means adapted during the rotation of said driving means to transport the severed label, feed it to the moistening device and apply it on to the support on which it is to be affixed.

59. An apparatus for delivering and affixing labels, stamps and the like, comprising in combination a drum-shaped driving means adapted to be rotated by the apparatus being moved on a support, a storage reel for labels connected to form a strip, arrangements for pulling a label off said reel, arrangements for severing this label from the strip, arrangements for moistening this severed label, and arrangements for pulling off, severing and moistening a label actuated by said driving means, radially shiftable carriers in said driving means, movable pins in said carriers, controlling elements connected with said carriers and actuated by said driving means, said elements adapted, during the rotation of said driving means, to temporarily pull said carriers into said driving means, and said pins adapted to hold a severed label on said driving means and transport the same during the rotation of said driving means.

60. An apparatus for delivering and affixing labels, stamps and the like, comprising in combination a drum-shaped driving means adapted to be rotated by the apparatus being moved over a support, a storage reel for labels connected in the form of a strip, an arrangement for pulling a label off said reel, an arrangement for severing this label from the strip, an arrangement for moistening this severed label, all of said arrangements controlled by said driving means, movable pins on said driving means adapted to hold the severed label on said means and transport this label during the rotation of said means, a stationary axle carrying said driving means, radially movable carriers for said pins bearing on said axle, and said axle being flattened on a portion of its periphery.

61. An apparatus for delivering and affixing labels, stamps and the like, comprising in combination a drum-shaped driving means adapted to be rotated by the apparatus being moved over a support, a storage reel for labels connected to form a strip, an arrangement for pulling a label off said reel, an arrangement for severing this label from the strip, an arrangement for moistening this severed label, all of said arrangements controlled by said driving means, movable pins on said driving means adapted to hold the severed label on said driving means, a carrier plate carrying said pins, an axle for said carrier plate radially shiftable relatively to said drum-shaped driving means, said carrier plate rotatable on said radially shiftable axle.

62. An apparatus for delivering and affixing labels, stamps and the like, comprising in combination a drum-shaped driving means adapted to be rotated by the apparatus being moved on a support, a storage reel for labels connected to form a strip, an arrangement for pulling a label off said reel, an arrangement for severing this label, an arrangement for moistening this severed label, all of said arrangements controlled by said driving means, movable pins on said driving means adapted to hold the severed label, a rotatable carrier plate carrying said pins, a toothed wheel coupled with said carrier plate, an axle for said carrier plate arranged radially to said drum-shaped driving means and within the same, a stationary axle carrying said driving means, a stationary pin connected with said last mentioned axle and adapted, during the rotation of said driving means to engage said toothed 63. An apparatus for delivering and affixing labels, stamps and the like, comprising in combination a drum-shaped driving means adapted to be rotated by the apparatus being moved over a support, a stationary axle carrying said driving means, a storage reel for labels connected to form a strip, an arrangement for pulling a label off said reel, an arrangement for severing this label from the strip, an arrangement for moistening the severed label, all of said arrangements controlled by said driving means, movable pins on said driving means adapted to hold the severed label on said driving means, and to transport the same during the rotation of said driving means, a rotatable carrier plate carrying said pins, a toothed wheel connected to said cam plate, a square portion on said plate, a stationary pin fixed on said stationary axis and adapted, during the rotation of said driving means, to engage said toothed wheel and rotate said plate, two blade springs fixed on said driving means and acting on said square portion to arrest said carrier plate after each rotation through an angle of 90°.

64. An apparatus for delivering and affixing labels, stamps and the like, comprising in combination a drum-shaped driving means adapted to be rotated by the apparatus being shifted on a support, a stationary axis carrying said driving means, a storage reel for labels connected to form a strip, an arrangement for pulling a label off said reel, an arrangement for severing this label from the strip, said arrangements controlled by said driving means, movable pins on said driving means adapted to hold the severed label on said driving means and to transport the same during the rotation of said driving means, a carrier plate carrying said pins, a carrier pin rigidly connected to said plate and extending radially to said driving means, a sleeve adapted to accommodate said carrier plate and said carrier pin, one end of said sleeve having apertures for the passage of the pins on said carrier plate, a square portion on said sleeve, a toothed wheel on said plate, a stationary pin fixed on said stationary axle adapted to engage said toothed wheel, and rotate said sleeve during the rotation of said driving means, two blade springs fixed on said driving means adapted to cooperate with said square portion to arrest said sleeve after each rotation through an angle of 90°, a bearing for said sleeve on said driving means, said carrier plate and said carrier pin radially shiftable in said sleeve relative to said driving means, one end of said pin bearing against said stationary axle and said axle having a flattened portion on part of its periphery to enable said carrier pin, said carrier plate and the pin on said plate to move into the interior of said driving means.

65. An apparatus for delivering and affixing labels, stamps and the like, comprising in combination a drum-shaped driving means adapted to be rotated by the apparatus being moved on a support, a storage reel for labels connected to form a strip, an arrangement for pulling a label off said reel, an arrangement for severing this label from the strip, an arrangement for moistening this severed strip, all these arrangements operated by said driving means, pins radially shiftable on said driving means and adapted to hold a severed label on said driving means and to transport this label during the rotation of said driving means, said pins being tapered and adapted to liberate the label adhering thereon when pushed back by the support onto which the label is to be affixed.

66. An apparatus for delivering and affixing labels, stamps and the like, comprising in combination, a stationary axis in said apparatus, a drum-shaped driving means adapted to be rotated about said axis by the apparatus being moved on a support, a storage reel for labels connected to form a strip, an arrangement for pulling a label off said reel, an arrangement for severing this label from the strip, an arrangement for moistening the severed label, all of said arrangements actuated by said driving means, arrangements for defacing said label arranged on said driving means.

67. An apparatus for delivering and affixing labels, stamps and the like, comprising in combination a drum-shaped driving means adapted to be rotated by the apparatus being moved on a support, a storage reel for labels connected to form a strip, an arrangement for pulling a label off said reel, an arrangement for severing this label from the strip, an arrangement for moistening the severed strip, all of said arrangements operated by said driving means, means for defacing said label, said means composed of movable pins adapted to perforate the severed label and arranged on the periphery of said drum-shaped driving means.

68. An apparatus for delivering and affixing labels, stamps and the like, comprising in combination a drum-shaped driving means adapted to be rotated by the apparatus being moved on a support, a storage reel for labels connected to form a strip, arrangements for pulling a label off said reel, arrangements for severing this label from the strip, arrangements for moistening this label, all of said arrangements controlled by said driving means, said driving means adapted to transport the severed label and press the same on the support, movable pins on said driving means and adapted to perforate the severed label, a printing plate arranged on said driving means and adapted to print a distinctive mark on the severed label, and said pins movable in the interior of said plate.

69. An apparatus for delivering and affixing labels, stamps and the like, comprising in combination a drum-shaped driving means adapted to be rotated by the apparatus being moved on a support, a storage reel for labels connected to form a strip, an arrangement for pulling a label off said reel, an arrangement for severing this label from the strip, an arrangement for moistening this severed label, all of said arrangements actuated by said driving means, said driving means adapted to stick a severed and moistened label on a support, movable pins on said driving means adapted to perforate the severed label, several printing plates on said driving means adapted to print a distinctive mark on the severed stamp and on the support on which the label is stuck, said movable pins mounted on the interior of one of said plates.

70. An apparatus for delivering and affixing labels, stamps and the like, comprising in combination a drum-shaped driving means adapted to be rotated by the apparatus being moved over a support, a storage reel for the labels connected to form a strip, an exchangeable casing carrying said reel, a reciprocable arrangement adapted to pull a label out of said casing, a reciprocable arrangement adapted to sever this label from the strip, a removable arrangement adapted to moisten the severed label, a value adding mechanism, a label counting mechanism, all said arrangements for pulling off, severing and moistening the label actuated by said driving means, an arrangement for locking said driving means against rotation, hand operated means for liberating said driving means, an arrangement for securing said exchangeable casing in the apparatus during the rotation of said driving means, said driving means adapted to affix the label on a support, printing plates on said driving means adapted to print a mark on the label and on the support, an ink cylinder mounted on the apparatus adapted to ink said plates, a housing enclosing the apparatus with all its arrangements and mechanisms, said housing having a closable aperture for the insertion of said arrangement for moistening a severed label, an opening for inserting said exchangeable casing, a window for rendering visible said value adding mechanism and said label counting mechanism, and an aperture for inserting the hand actuated arrangement for liberating said driving means.

71. An apparatus for delivering and affixing labels, stamps and the like, comprising in combination a storage reel for labels, an exchangeable casing accommodating said storage reel, a driving means adapted to be rotated when the apparatus is shifted on a support, a locking device adapted to lock said driving means in inoperative position, hand operated devices adapted to liberate said driving means, an arrangement for feeding a label from said reel controlled by said driving means during its rotation, an arrangement also actuated by said driving means and adapted to moisten the label during its feeding movement, said last mentioned arrangement composed of a water container and a hollow perforated moistening roller connected with said container, a valve on said container adapted to admit air into said water container and actuated by said hand operated device for liberating said driving means, said valve comprising two mutually shiftable discs each provided with an aperture, a spring acting on said discs, means for rotating one disc against the action of said spring to bring the aperture of this disc into register with that in the other disc.

HILDE KOMUSIN, GEB. PETTERSSON.